(12) United States Patent
Rhoades et al.

(10) Patent No.: US 11,999,282 B2
(45) Date of Patent: Jun. 4, 2024

(54) MODULAR LATCHING SYSTEM

(71) Applicant: NIFCO AMERICA CORP., Canal Winchester, OH (US)

(72) Inventors: William Russell Rhoades, Columbus, OH (US); Kelly Paige Miller, Dublin, OH (US)

(73) Assignee: NIFCO AMERICA CORP., Canal Winchester, OH (US)

( * ) Notice: Subject to any disclaimer, the term of this patent is extended or adjusted under 35 U.S.C. 154(b) by 517 days.

(21) Appl. No.: 17/227,782

(22) Filed: Apr. 12, 2021

(65) Prior Publication Data
US 2022/0324365 A1 Oct. 13, 2022

(51) Int. Cl.
  *E05C 9/04* (2006.01)
  *B60N 3/10* (2006.01)
  *F16B 2/20* (2006.01)
  *E05C 9/00* (2006.01)

(52) U.S. Cl.
  CPC ........... *B60N 3/103* (2013.01); *E05C 9/04* (2013.01); *F16B 2/20* (2013.01); *Y10T 292/0951* (2015.04)

(58) Field of Classification Search
  CPC ......... Y10T 292/0961; Y10T 292/0964; Y10T 292/0969; Y10T 292/0977; Y10T 292/0995; Y10T 292/0997; E05C 9/04; E05C 9/045
  See application file for complete search history.

(56) References Cited

U.S. PATENT DOCUMENTS

| | | | | |
|---|---|---|---|---|
| 3,061,325 A * | 10/1962 | Glass | ............... | A63C 9/08564 280/613 |
| 4,943,124 A * | 7/1990 | Dietz | ............... | B60N 3/083 292/170 |
| 5,626,374 A * | 5/1997 | Kim | ............... | G11B 25/063 292/137 |
| 6,029,940 A * | 2/2000 | Klein | ............... | H05K 5/0204 248/500 |
| 7,410,194 B2 * | 8/2008 | Chen | ............... | E05C 9/045 361/679.55 |
| 2007/0278372 A1* | 12/2007 | Okada | ............... | B60N 3/101 248/311.2 |
| 2008/0093405 A1* | 4/2008 | Abe | ............... | B60N 3/103 248/346.03 |

FOREIGN PATENT DOCUMENTS

JP H0199735 U * 7/1989

* cited by examiner

*Primary Examiner* — Carlos Lugo
(74) *Attorney, Agent, or Firm* — HAUPTMAN HAM, LLP

(57) ABSTRACT

A modular latching system includes a panel having recessed pockets spaced apart from each other and having lock holes therein; a housing having insert assemblies on one side of the housing, the insert assemblies being spaced apart from each other to be inserted into the recessed pockets; locking members located in each of the insert assemblies and including lock tabs engaging the lock holes, and slide locks attached to the lock tabs so that when the insertion assemblies are inserted into the recessed pockets, the lock tabs enter the lock holes to lock the housing to the panel; and a release lever disposed in the housing and engaging the slide locks so that when the release lever is pushed, the slide locks move to disengage the lock tabs from the lock holes to release the housing from the panel.

10 Claims, 29 Drawing Sheets

MODULAR LATCHING SYSTEM

FIELD OF THE INVENTION

The present invention relates to a modular latching system for internal use in an automobile. More specifically, the present invention relates to interior components, such as cup holders, phone holders, USB ports, container, etc., with a modular latching system, structured so that the interior components can be removed and relocated throughout the interior of the vehicle. This structure also allows components to be easily installed and removed with or without controlled locking features that can breakaway for safety. This allows for each component to be customized and located to the user's current needs.

BACKGROUND OF THE INVENTION

Ideally vehicle manufacturers want to incorporate all the components that would accommodate all passenger wants and needs. This is not feasible due to the large number of component variations available. These constraints limit the number of components within the vehicle.

Manufacturers usually permanently install a few of these components into the interior of the vehicle to try and accommodate the majority of users. The ability to add and remove these components from location to location would allow passengers to conform the layout to their own needs and or wants.

Accordingly, it is an object of the present invention to provide a modular latching system for interior components for use within the interior of a vehicle structure, wherein the modular latching system will allow for the interior components to be quickly installed, removed and relocated throughout the structure of a vehicles interior.

Other objects and advantages of the invention will be apparent from the following description of the invention.

SUMMARY OF THE INVENTION

A modular latching system of the invention comprises a panel having recessed pockets spaced apart from each other and having lock holes therein, a housing having insert assemblies on one side of the housing, the insert assemblies being spaced apart from each other to be inserted into the recessed pockets, locking members located in each of the insert assemblies and including lock tabs engaging the lock holes, and slide locks attached to the lock tabs so that when the insertion assemblies are inserted into the recessed pockets, the lock tabs enter the lock holes to lock the housing to the panel, and a release lever disposed in the housing and engaging the slide locks so that when the release lever is pushed, the slide locks move to disengage the lock tabs from the lock holes to release the housing from the panel.

Accordingly, the housing can be attached to and removed from the panel as desired. If a plurality of panels is installed in an interior of an automobile, the housing can be moved from one place to another place. Also, a housing with one feature can be replaced with another housing with a different feature.

In the module latching system, each of the locking members further includes a spring pushing the lock tabs away from each other. Preferably, each of the recessed pockets includes a tapered part, and a locking port, and each of the insert assemblies includes a tapered portion entering into the tapered part and having an open back, and a slot so that the lock tab passes through the slot and the locking port.

In the module latching system, the release lever includes a lever portion, and a back member attached to the lever portion and engaging the slide locks so that when the lever portion is pushed, the back member pushes the slide locks to move close to each other to thereby disengage the lock tabs from the lock holes. The release lever further includes a spring arranged between the lever portion and the panel to push the lever portion in a direction away from the panel.

The back member may include tapered portions engaging the slide locks so that when the lever portion is pushed, the back member with the tapered portions moves downwardly to slide the slide locks to move close to each other.

The modular latching system may further comprise a retaining member disposed in the housing, a pivot portion attached to the retaining member for pivotally retaining the retaining member in the housing, and a retaining tab integrally formed with the retaining member so that when the retaining member is pushed in one direction, the retaining tab moves to block sliding of the slide locks to prevent the housing from being removed from the panel. In this structure, in case the housing is a cup holder, the retaining member projects inwardly into a holding portion of the cup holder so that when a cup is inserted into the holding portion, the retaining member is pushed outwardly to thereby move the retaining tab to block sliding of the slide locks. In this structure, when the housing is used, the housing can not be accidentally removed from the panel.

The modular latching system of the invention allows the component to be quickly installed, removed and relocated within the vehicle interior.

BRIEF DESCRIPTION OF THE DRAWINGS

The present invention will be more understood by referencing the following descriptions in conjunction with the accompanying drawings, in which.

DETAILED DESCRIPTION OF THE INVENTION

The following detailed description is exemplary in nature and is not intended to limit application and uses. Furthermore, there is no intention to be bound by any theory presented by the following detail.

Figure 1:
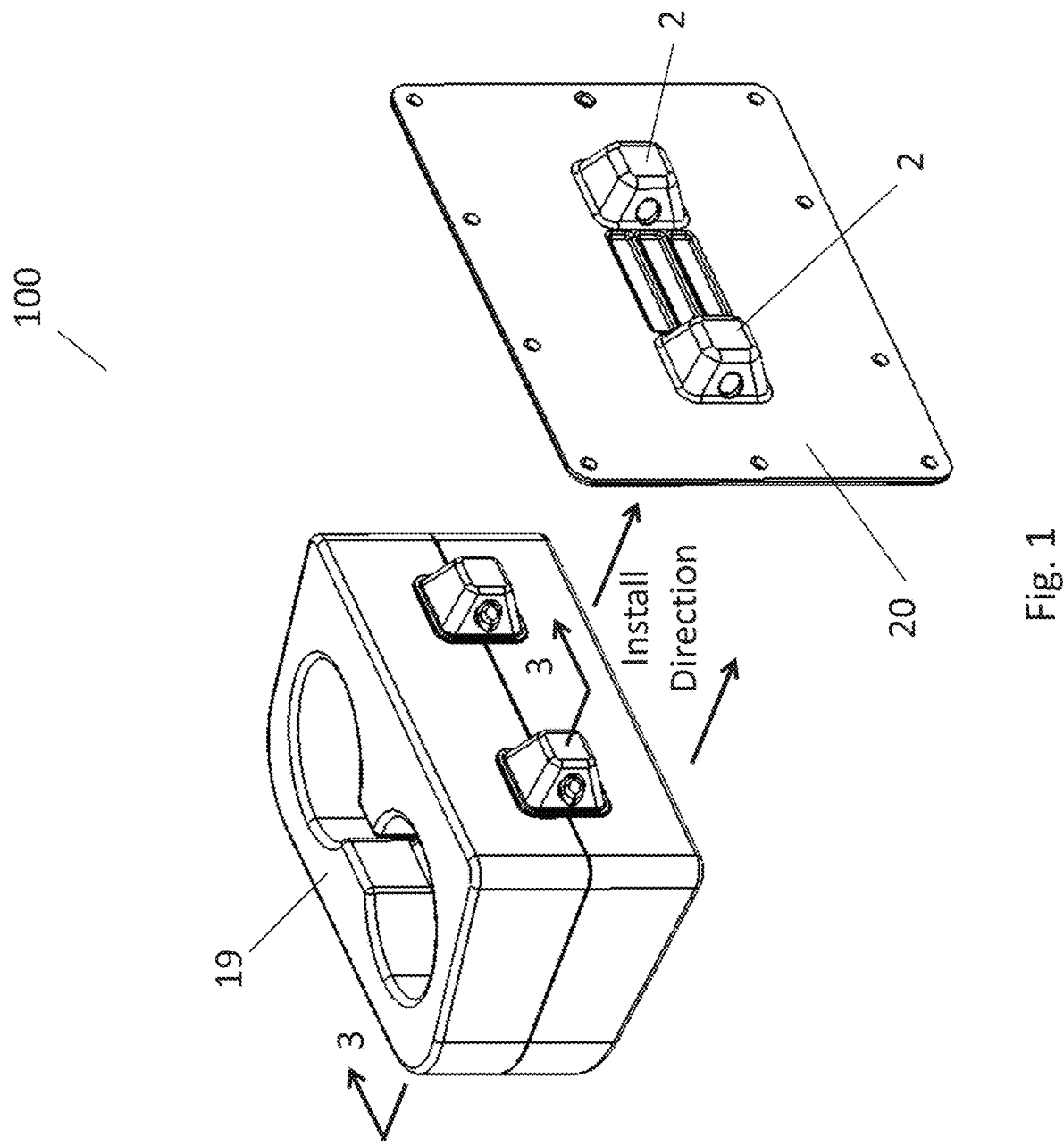
FIG. 1 shows an isometric view of the modular latching system.

FIG. 1 shows a modular latch system 100 comprising a component 19 and an interior vehicle panel 20, which are installed inside a vehicle. The component 19 in this example is a cup holder. Within the modular latching system 100, the component 19 can take many form with the same construction to accommodate users' needs, such as a trash bid, storage bin or an accessory holder, to be attached to the vehicle panel. The interior vehicle panel 20 have two recessed pockets 2 to hold the component 19.

Figure 2:
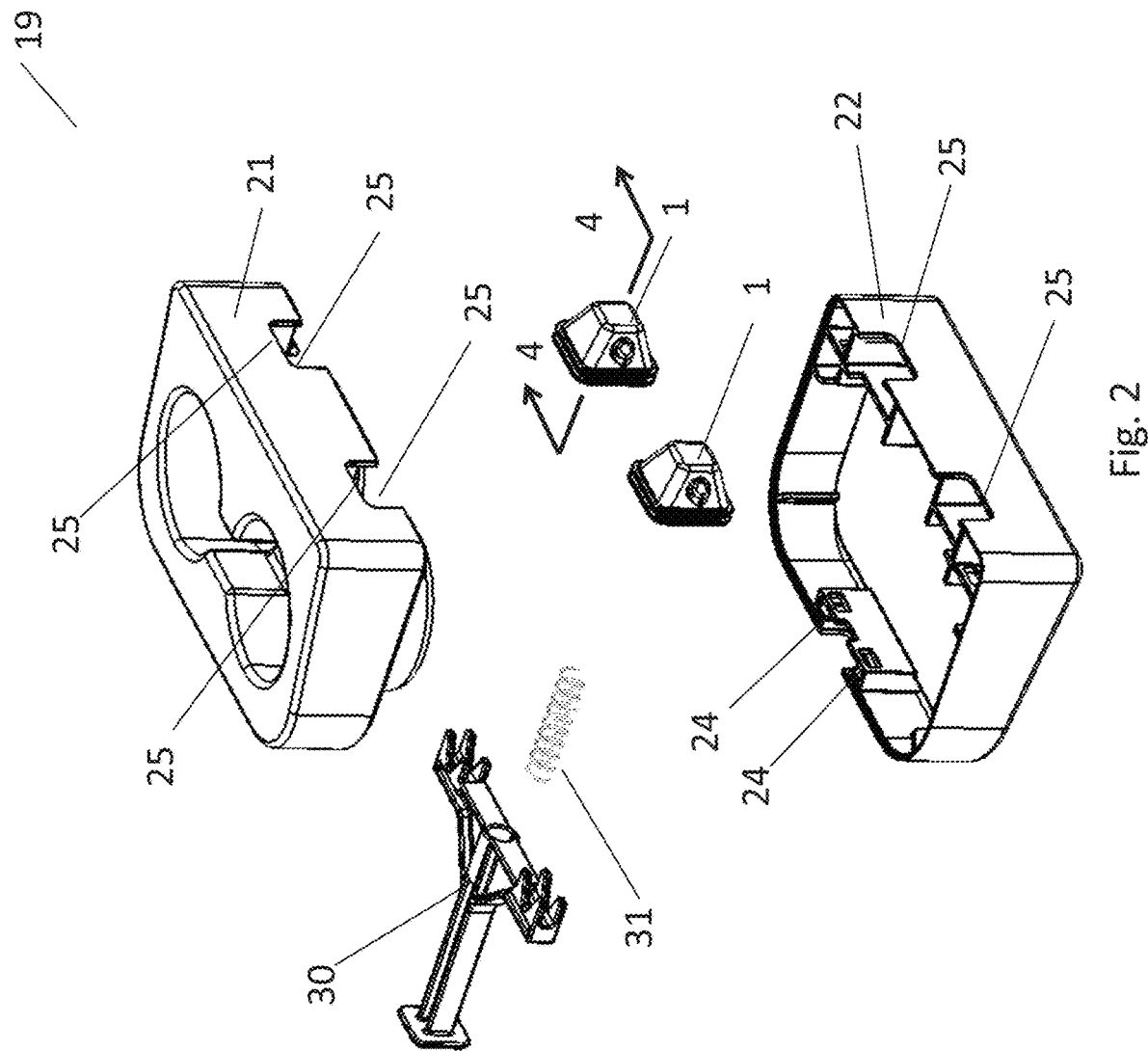
FIG. 2 shows an exploded isometric view of the component.
Figure 3:
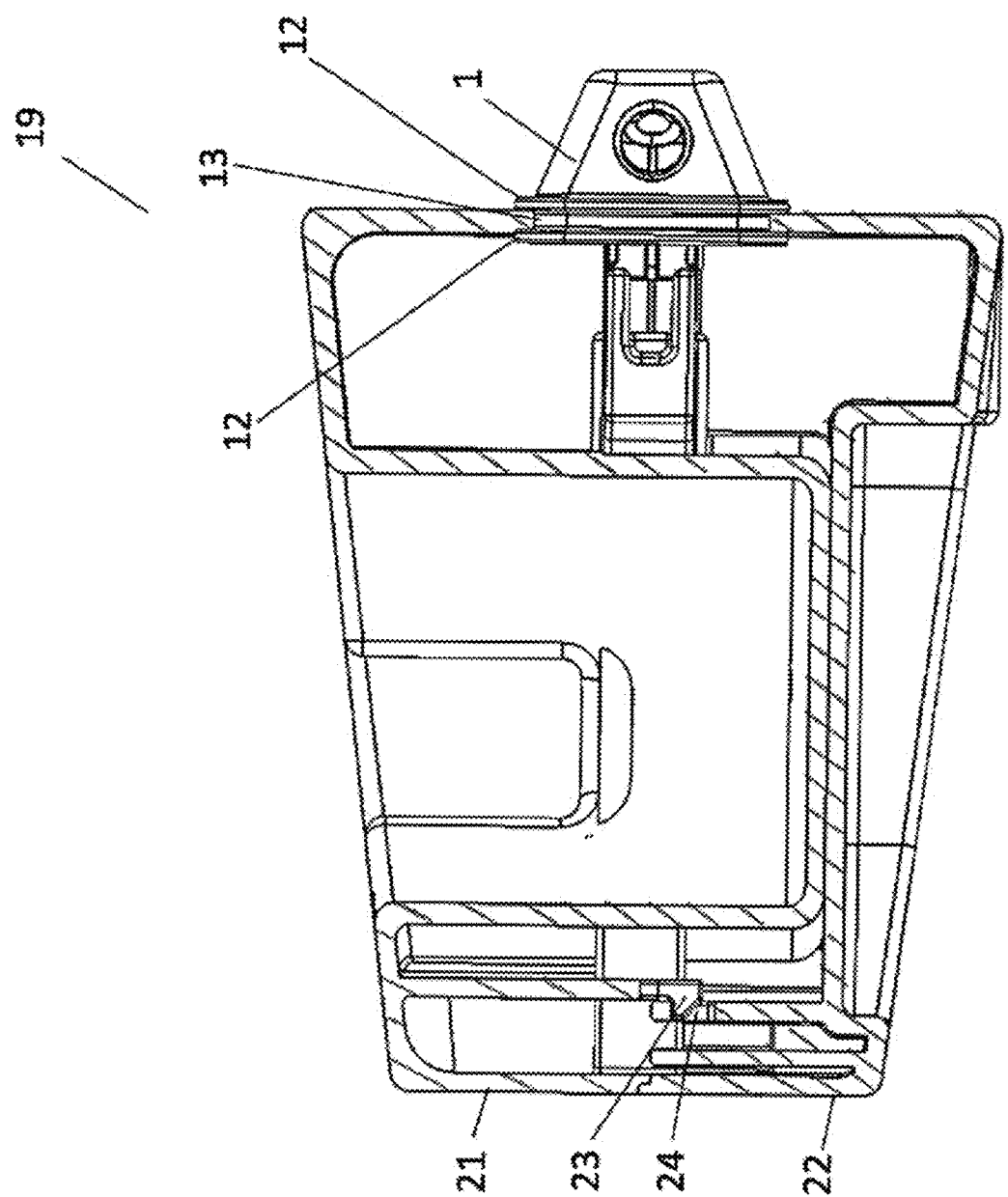
FIG. 3 is an enlarged cross section view taken along line 3-3 in FIG. 1.

FIG. 2 and FIG. 3 show that the component 19 comprises an upper housing 21 and a lower housing 22 that sandwich modular insert assemblies 1 and a release lever 30 therebetween. The upper housing 21 contains locking tabs 23, and the lower housing 22 contains recess tabs 24. When the two housings are assembled, the locking tabs 23 snap into the recess tabs 24 and retain the two housing together. The upper housing 21 and lower housing 22 also contain retaining notches 25 that locate and secure the insert assemblies 1 within the component 19.

The insert assembly 1 has a locating notch 13 with two locating flanges 12 one on either side around the full perimeter of the insert housing 3. Locating notches 25 of the upper housing 21 and the lower housing of 22 seat between the locating flanges 12 of the insert housing 3 and mate to the locating notch 13 of the insert housing 3 securing the insert assemblies 1 to the component 19. The release lever 30 is located within guide pockets in the upper housing 21 and the lower housing 22.

Figure 4:
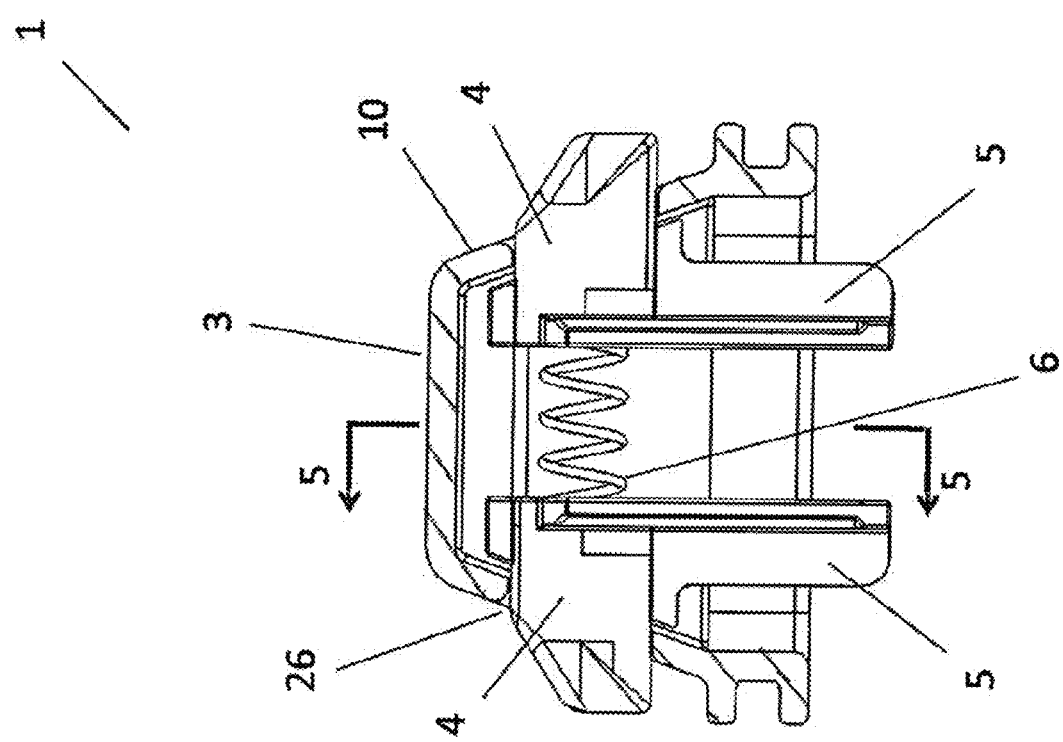
FIG. 4 is an enlarged cross section view taken along line 4-4 in FIG. 2.
Figure 5:
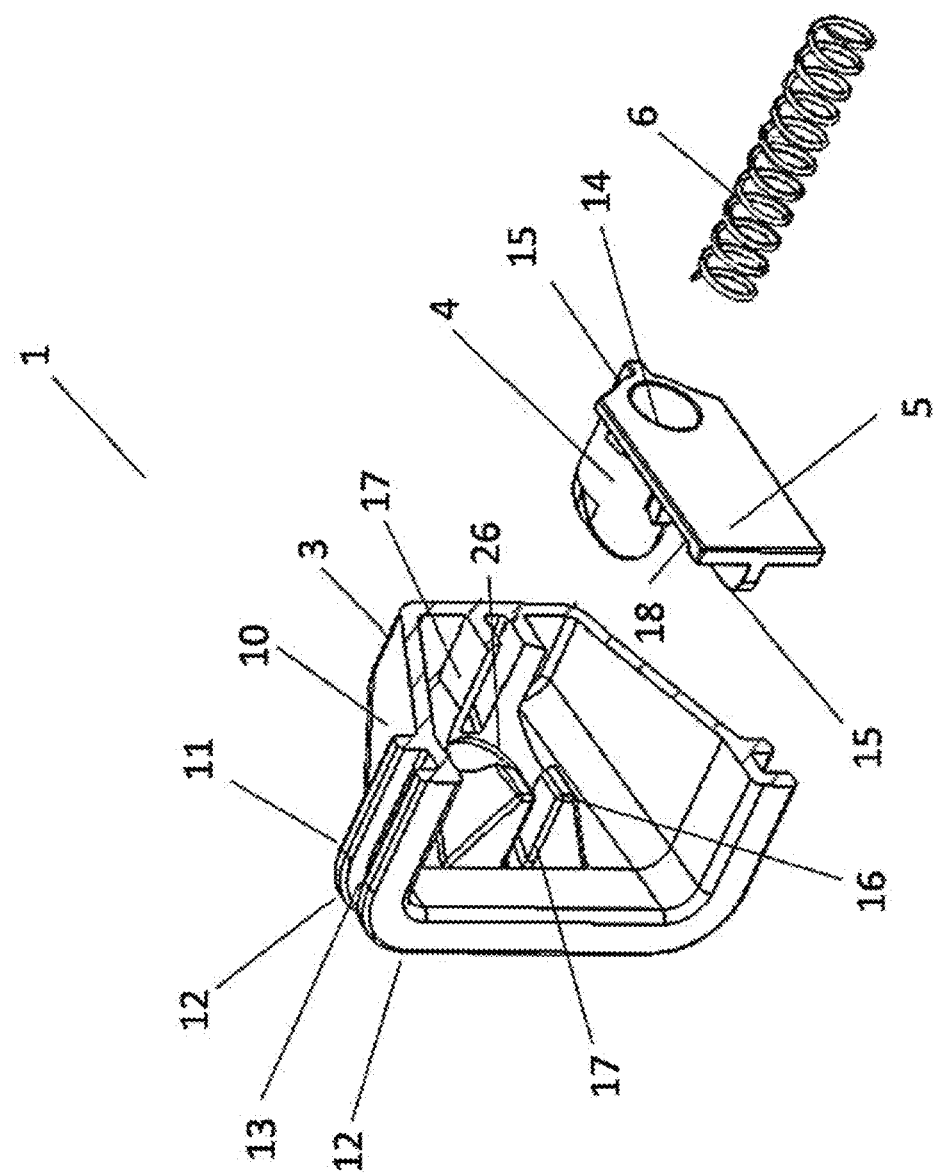
FIG. 5 is a cross section isometric view of insert assembly taken along line 5-5 in FIG. 4.

FIG. 4 and FIG. 5 show the insert assembly 1 which includes the insert housing 3, two sliding locks 5 and a compression spring 6. The slide locks 5 are placed inside the insert housing 3 with the locking tabs 4 passing through slide ports 26 of the insert housing 3. The slide lock 5 also includes an anti-rotational fin 15 located in the guide rails 17. Each end of the compression spring 6 is then placed into the spring ports 14 of the slide locks 5. The guide rail stop 16 controls the depth to which the locking tab 4 can protrude through the slide port 26 while under pressure from the compression spring 6.

Figure 6:
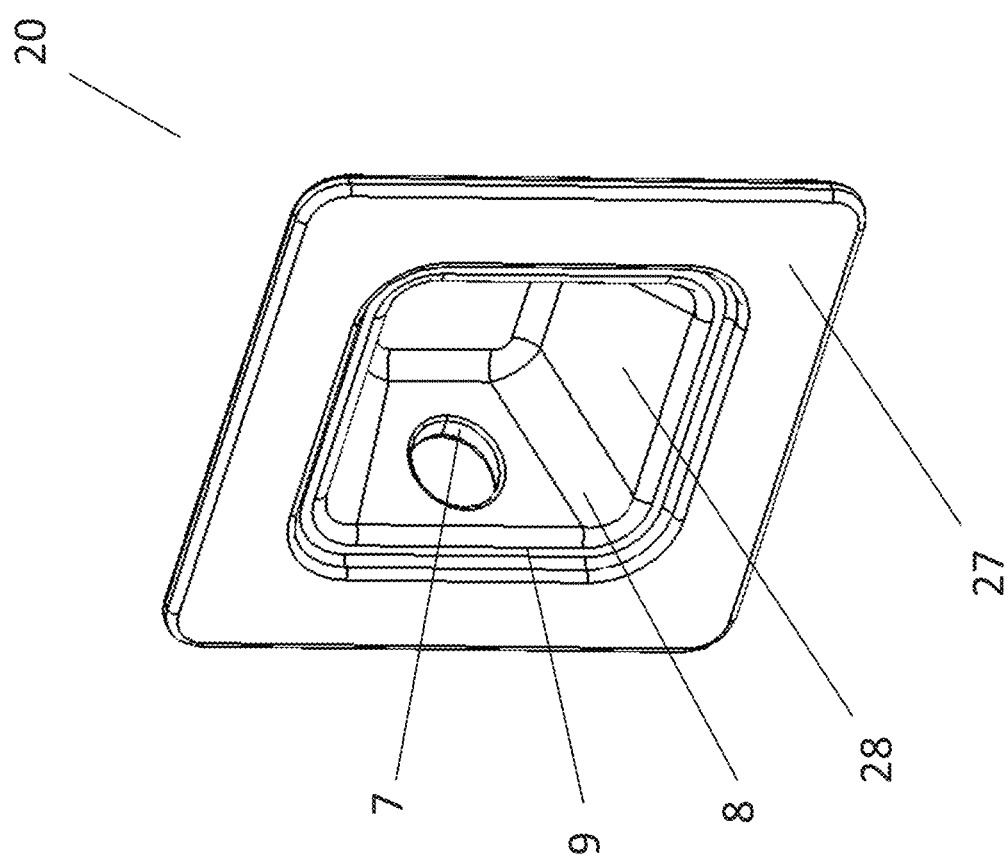
FIG. 6 shows an isometric view of the interior vehicle panel.

FIG. 6 shows the interior vehicle panel 20 comprising a panel face 27, pocket 8, a locking port 7 and a panel recess 9. This panel can be molded as part of the vehicles existing interior panels or as a separate interior panel that attaches to the vehicles existing interior panels.

Figure 7:
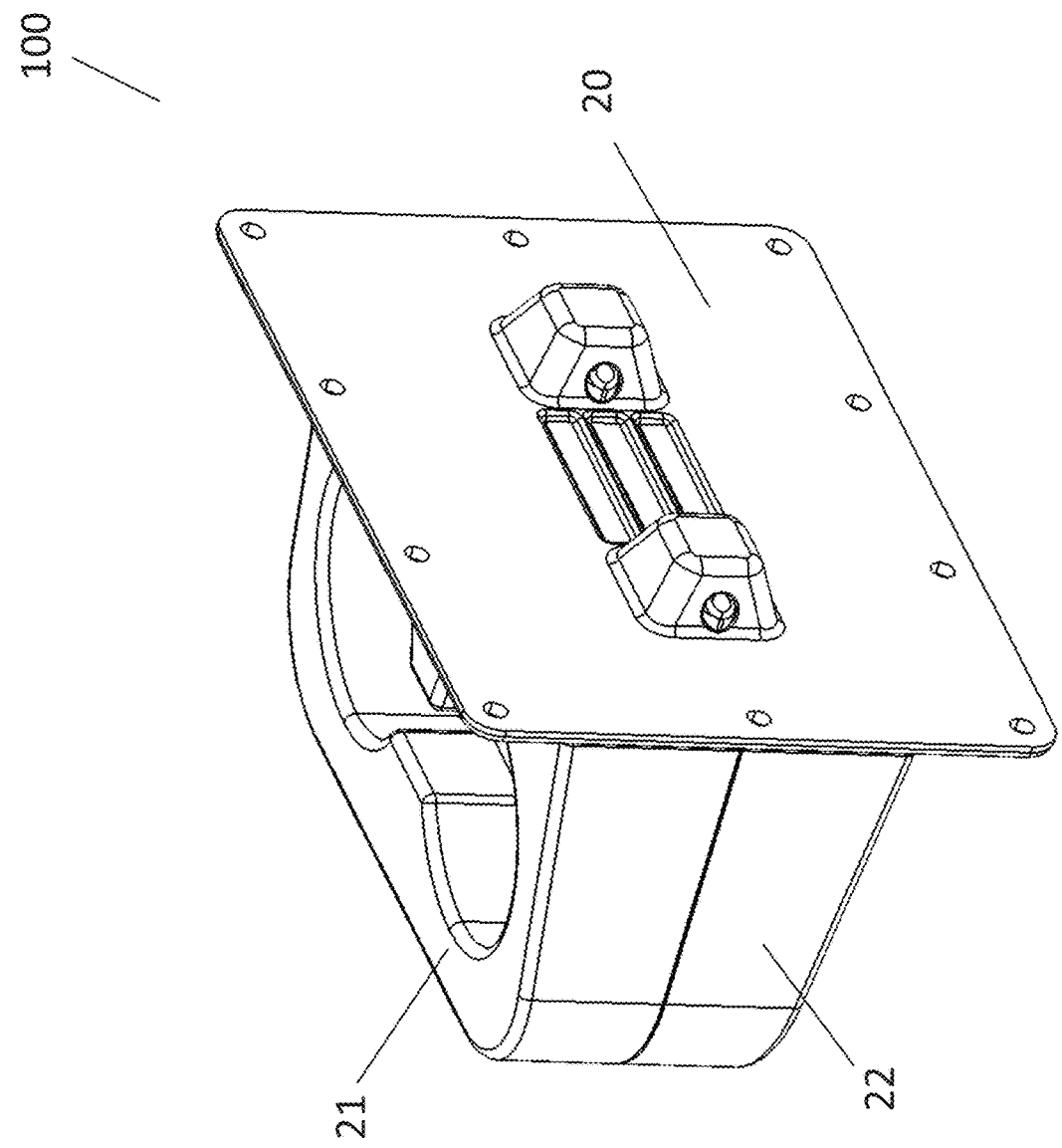
FIG. 7 shows an isometric view of the modular latching system.
Figure 8:
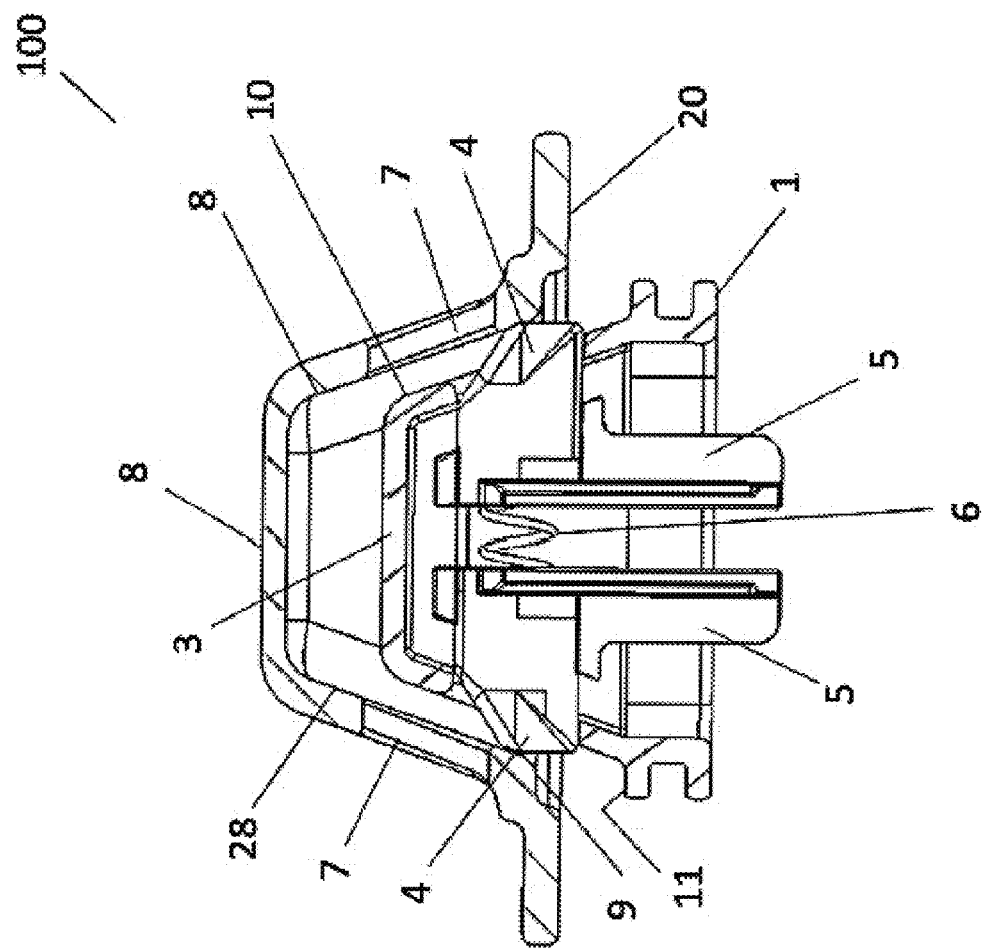
FIG. 8 shows a cross section view of the modular latching system installation similar to FIG. 5.
Figure 9:
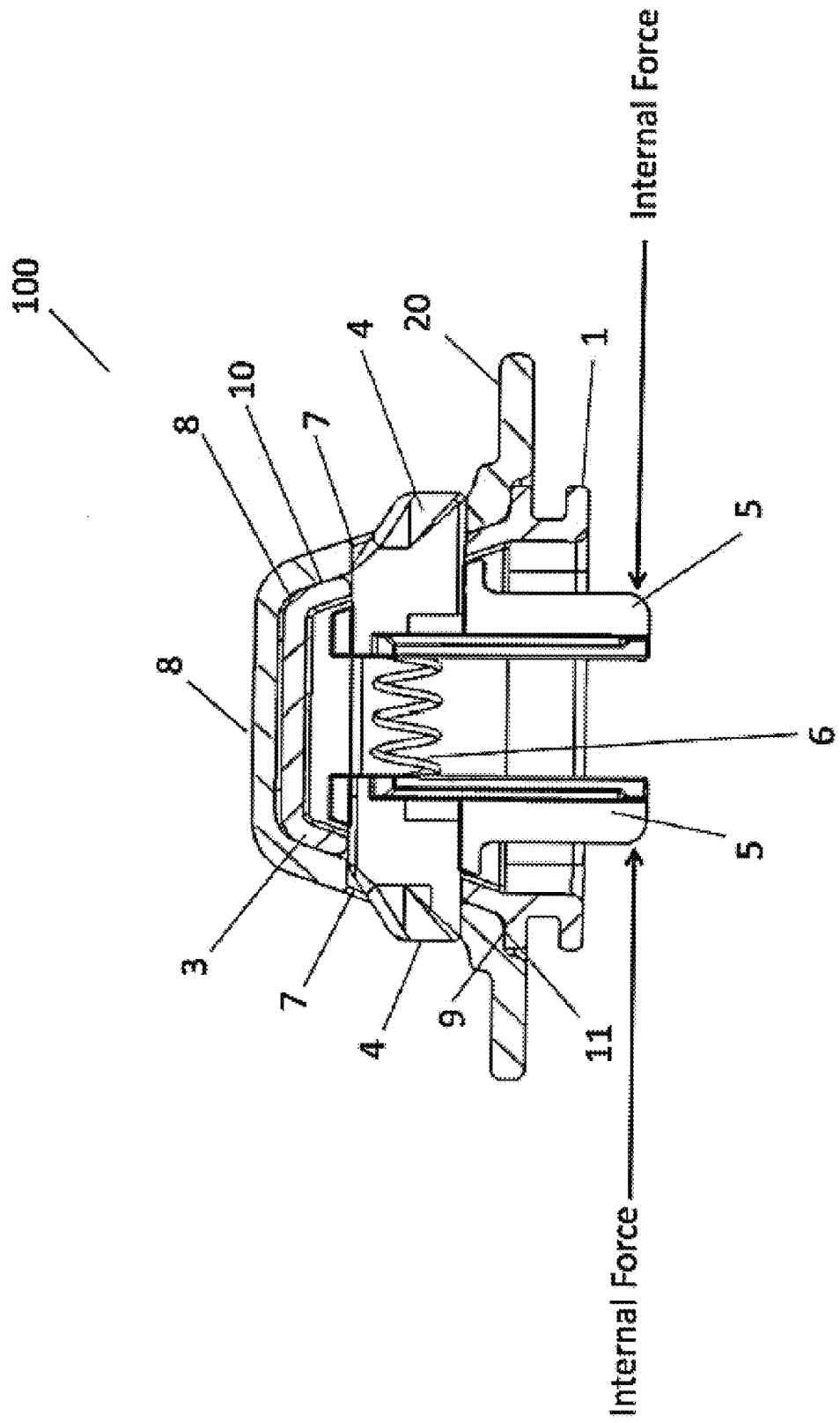
FIG. 9 shows a cross section view of the modular latching system installation similar to FIG. 4.
Figure 10:
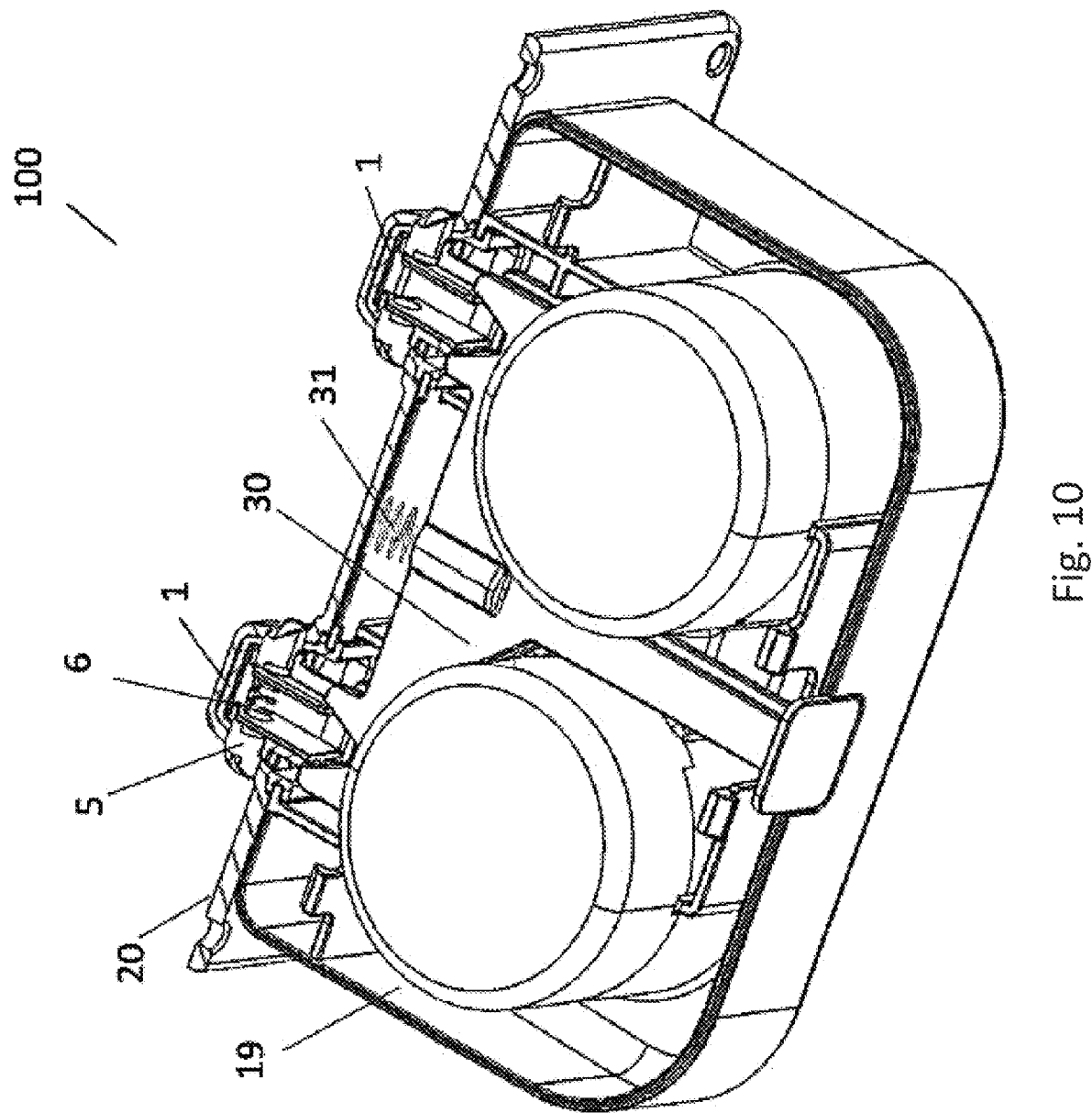
FIG. 10 is an exploded isometric bottom view of the modular latching system.
Figure 11:
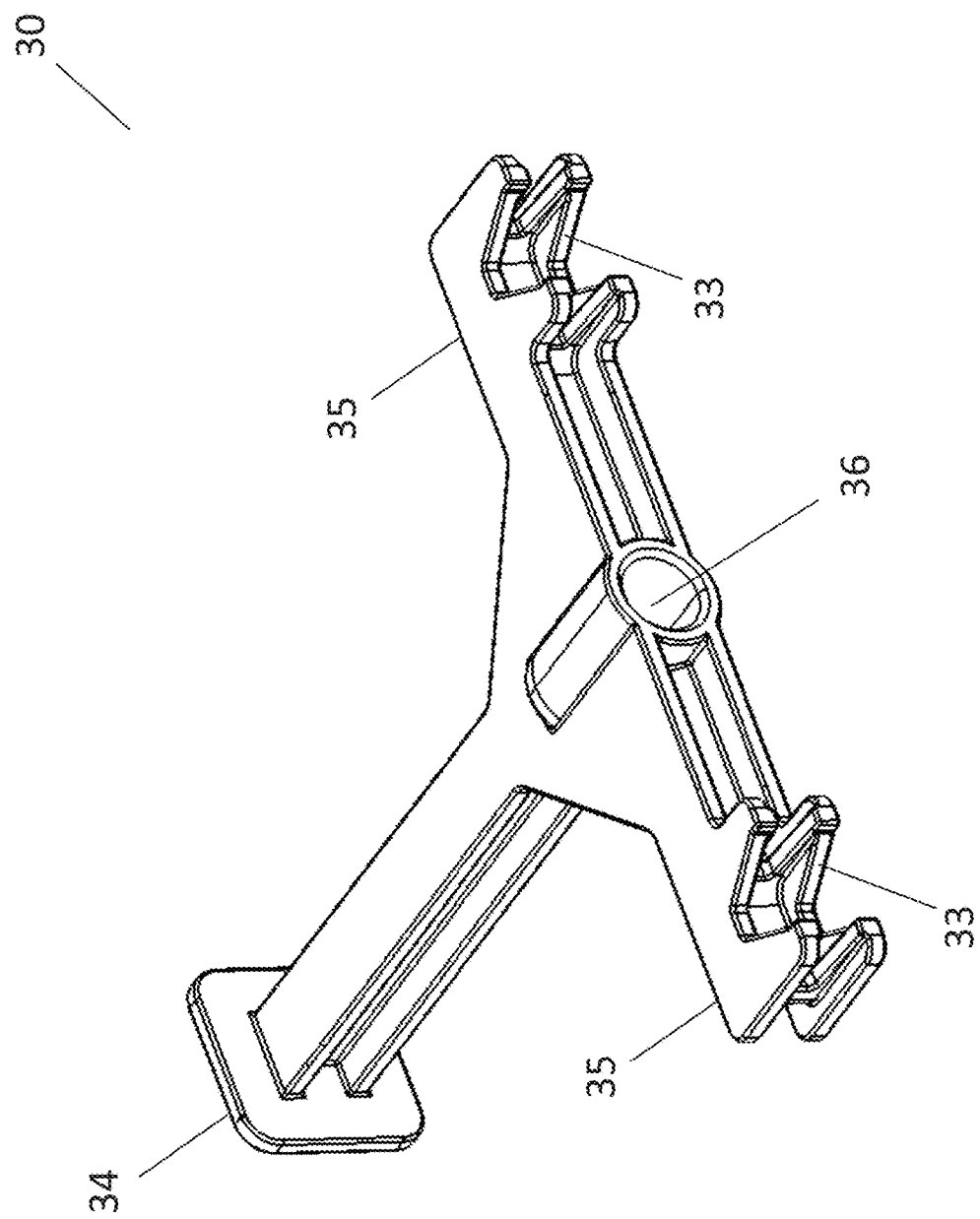
FIG. 11 is an isometric view of the release lever.
Figure 12:
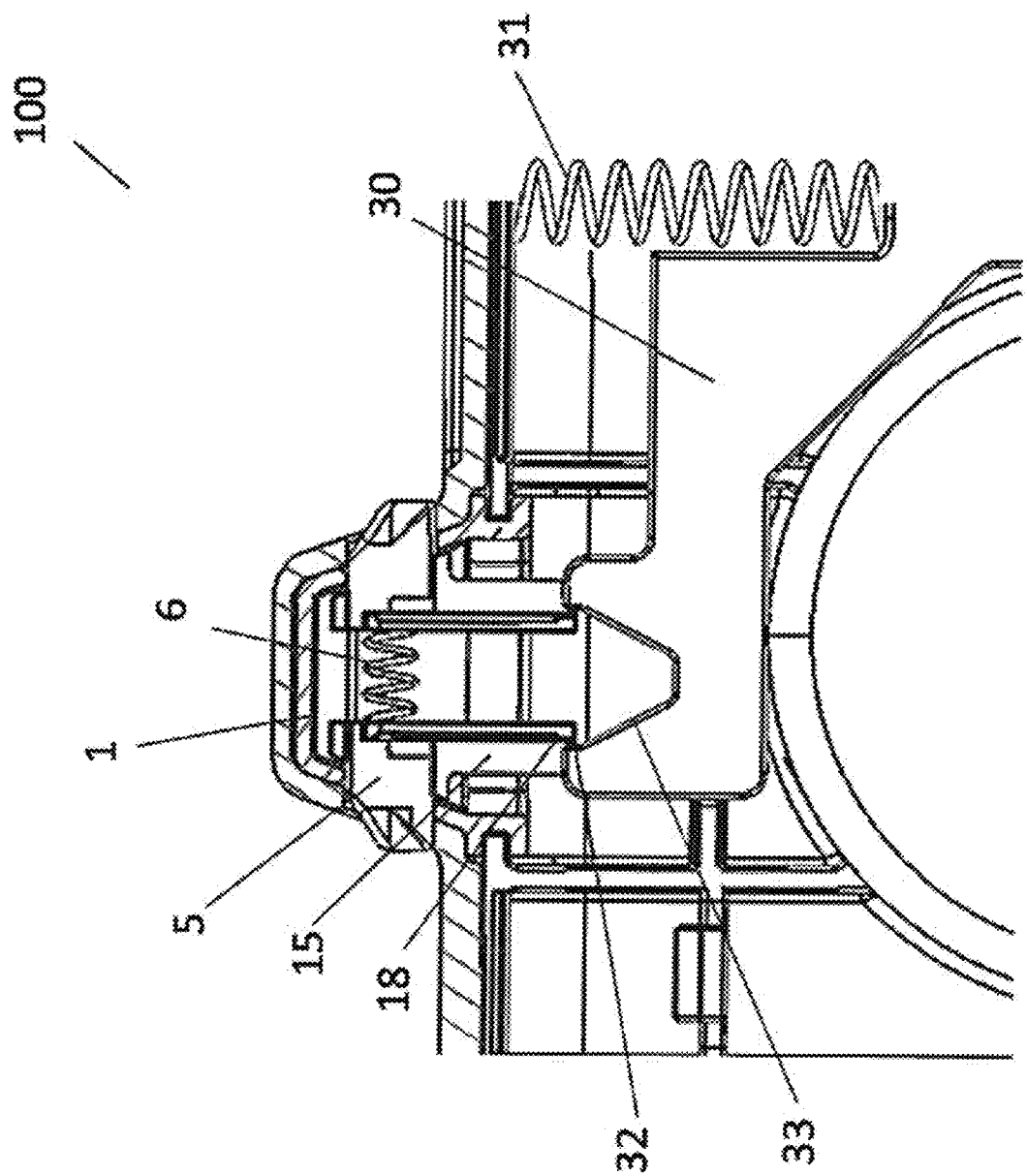
FIG. 12 is an explanatory view of the modular latching system assembled with the release lever.
Figure 13:
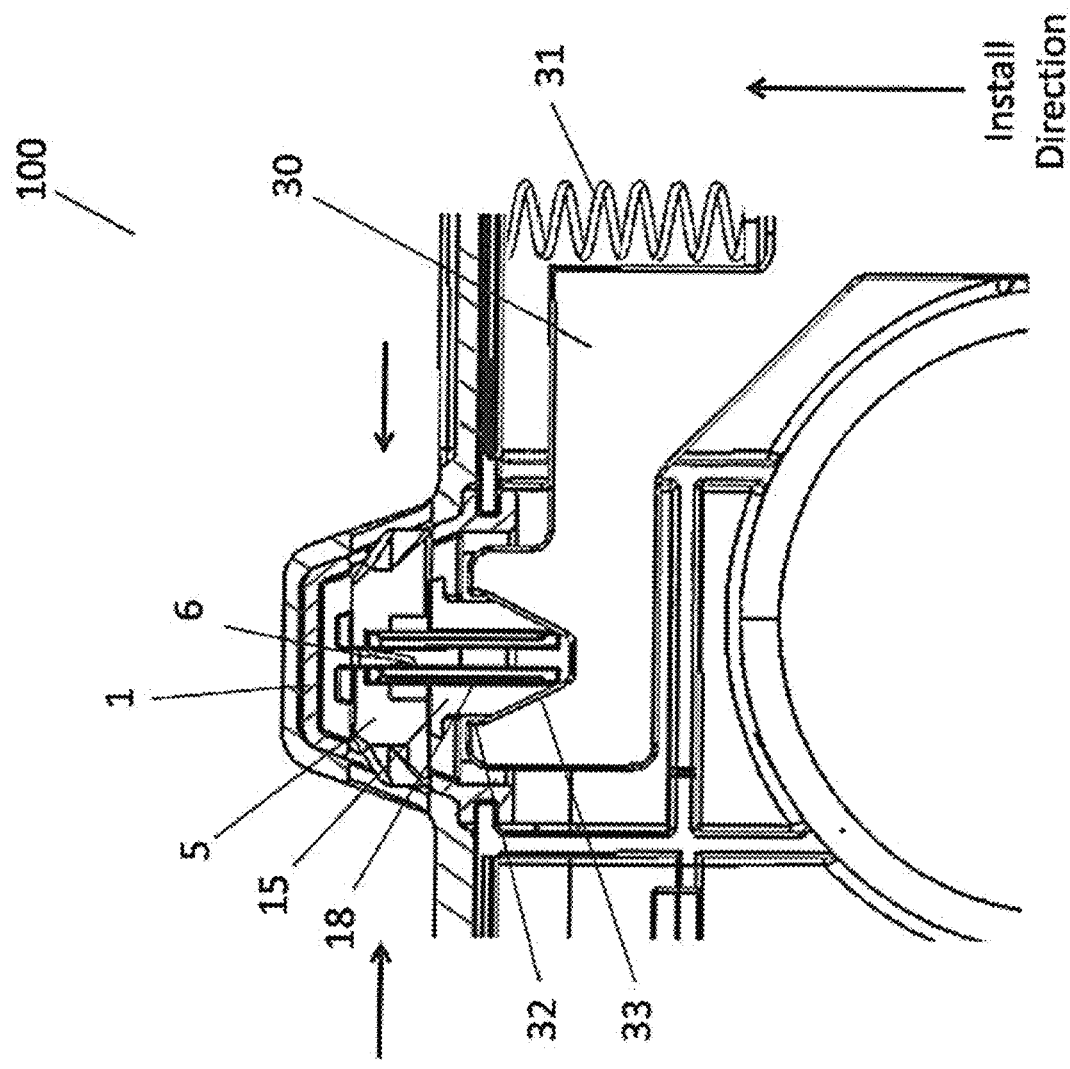
FIG. 13 is an explanatory view similar to FIG. 12 of the modular latching system when the release lever is pushed.
Figure 14:
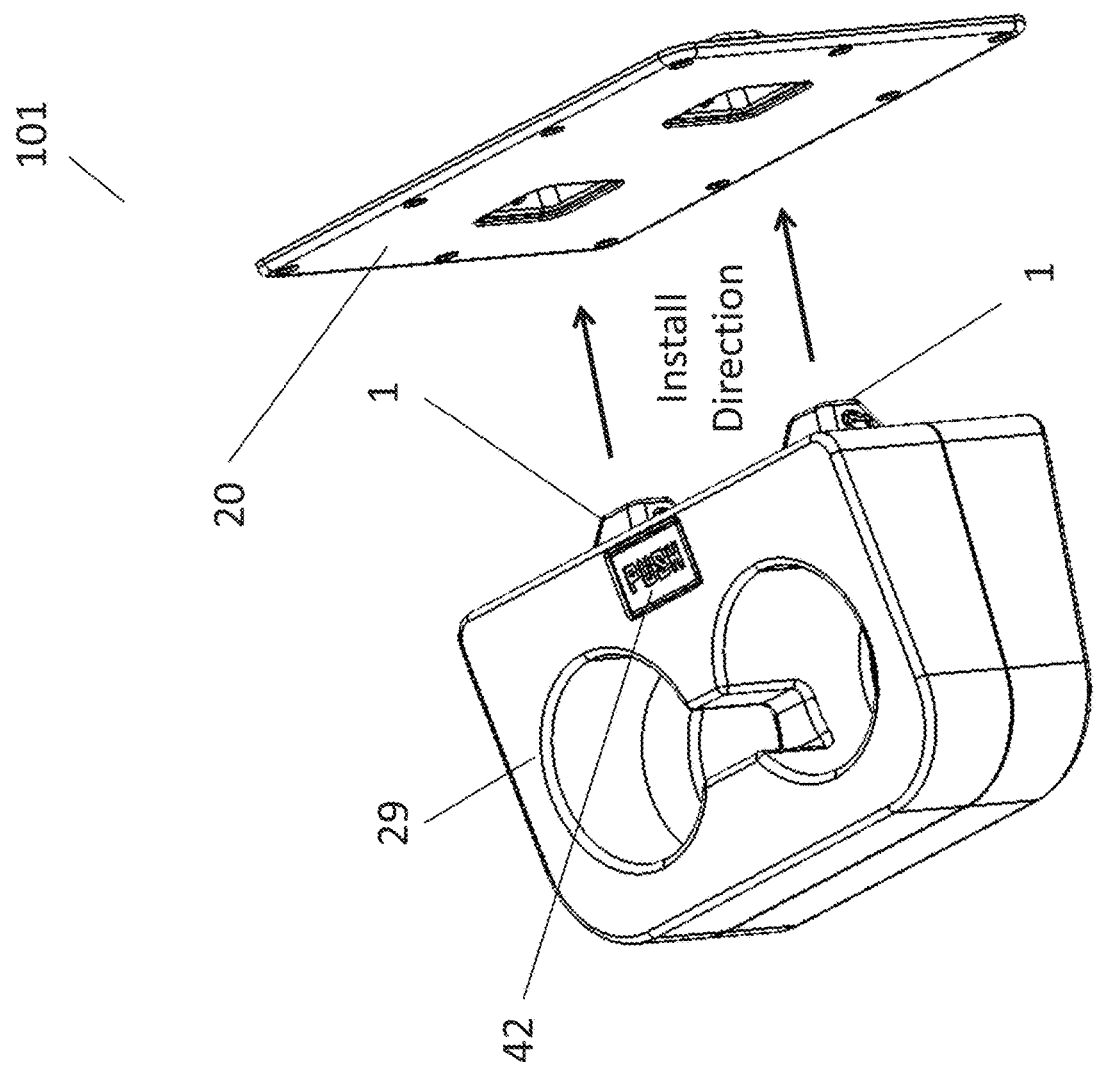
FIG. 14 shows an isometric section view of a modular latching system of another example.
Figure 15:
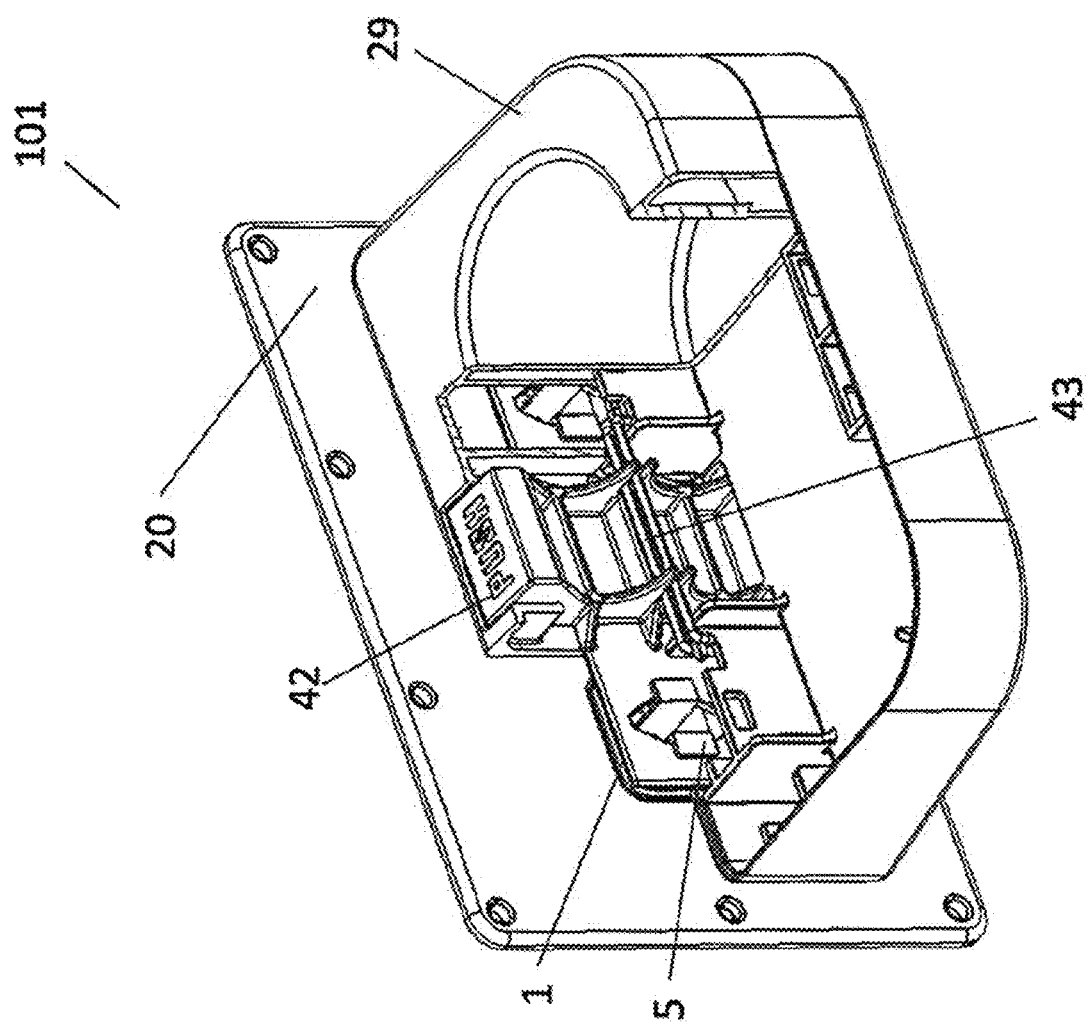
FIG. 15 is an isometric section view partially cutting a housing of the modular latching system shown in FIG. 14.
Figure 16:
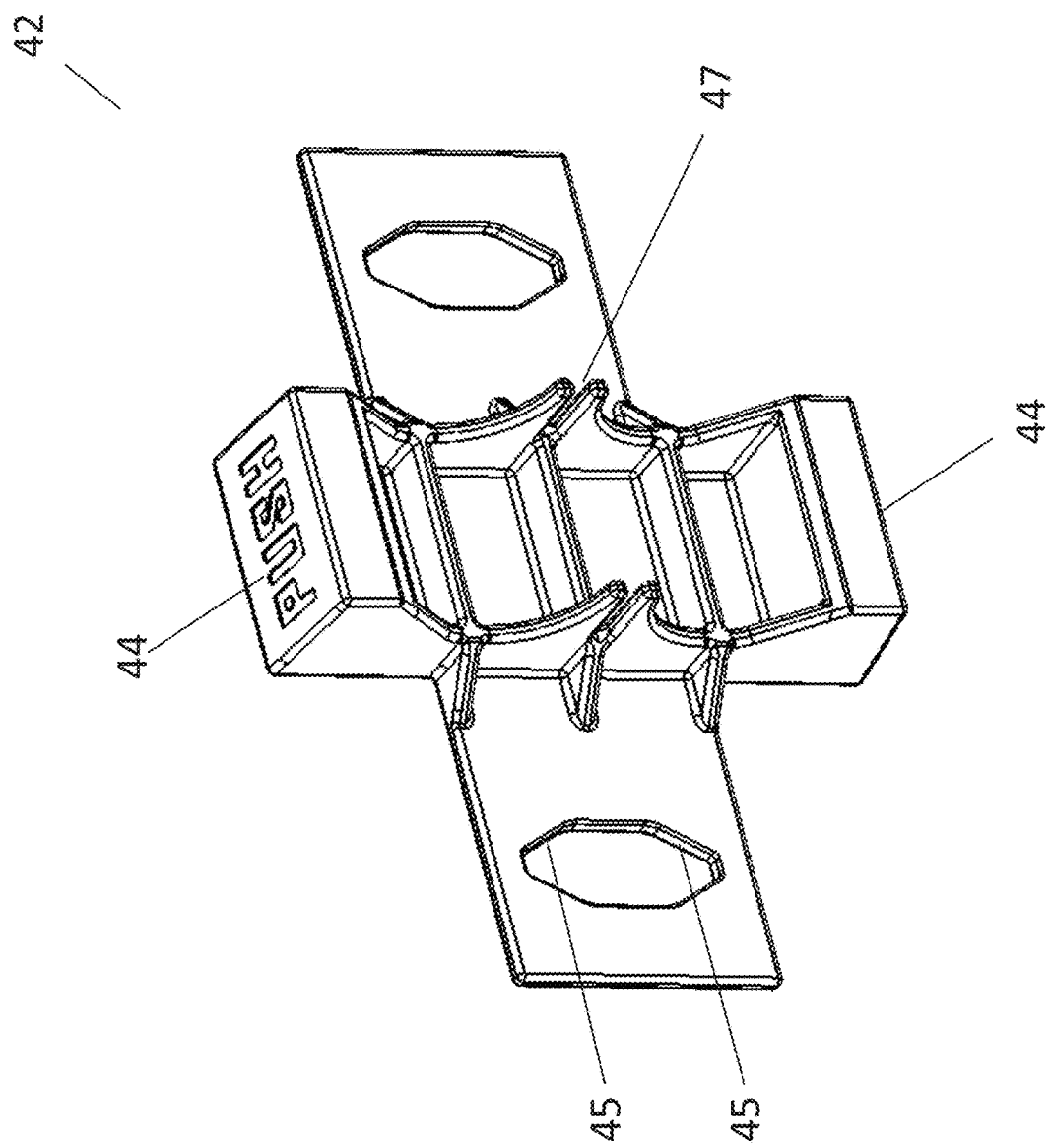
FIG. 16 is an isometric view of a release lever shown in FIG. 14.
Figure 17:
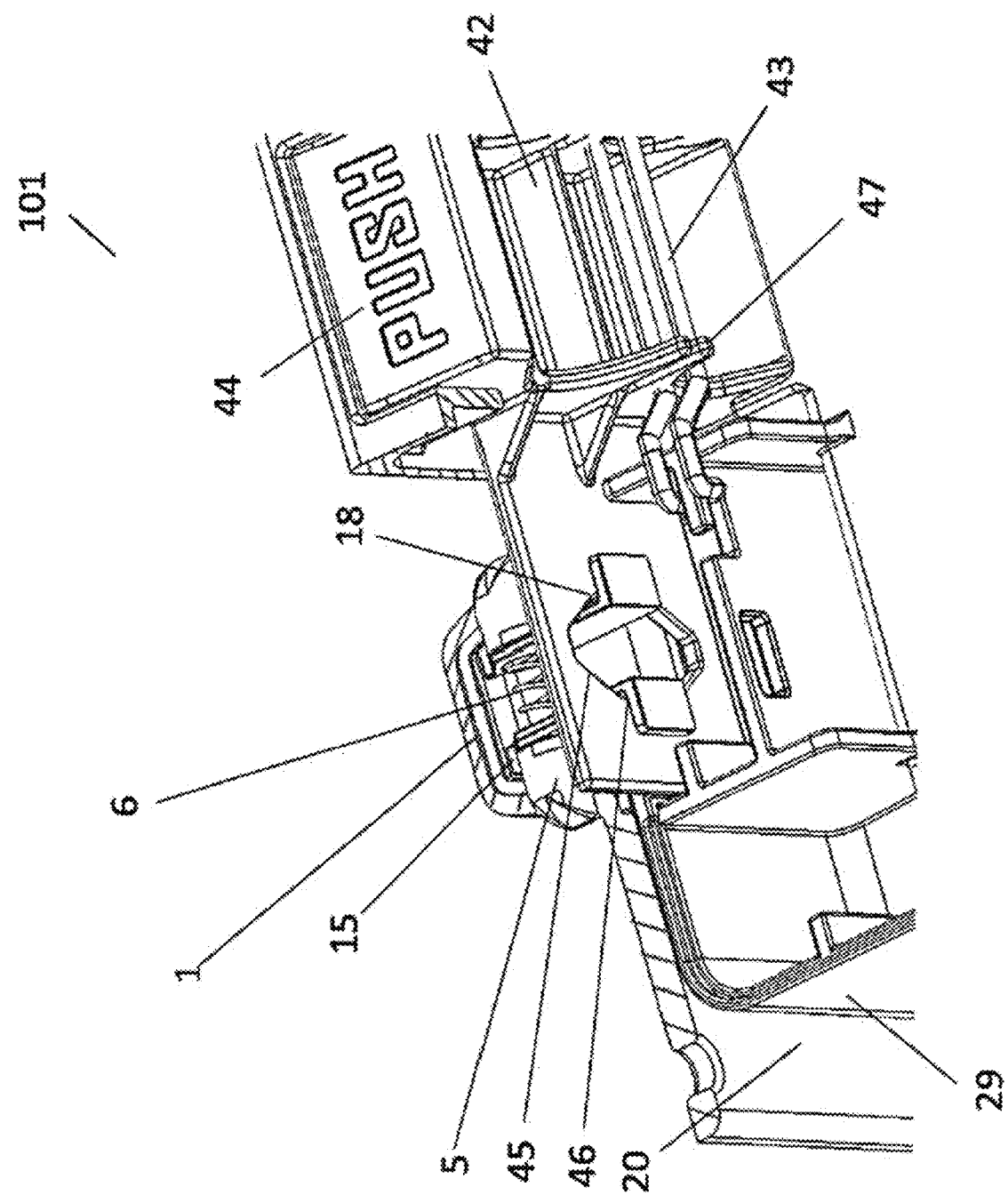
FIG. 17 is an isometric section view showing a connection of the release lever shown in FIG. 16.
Figure 18:
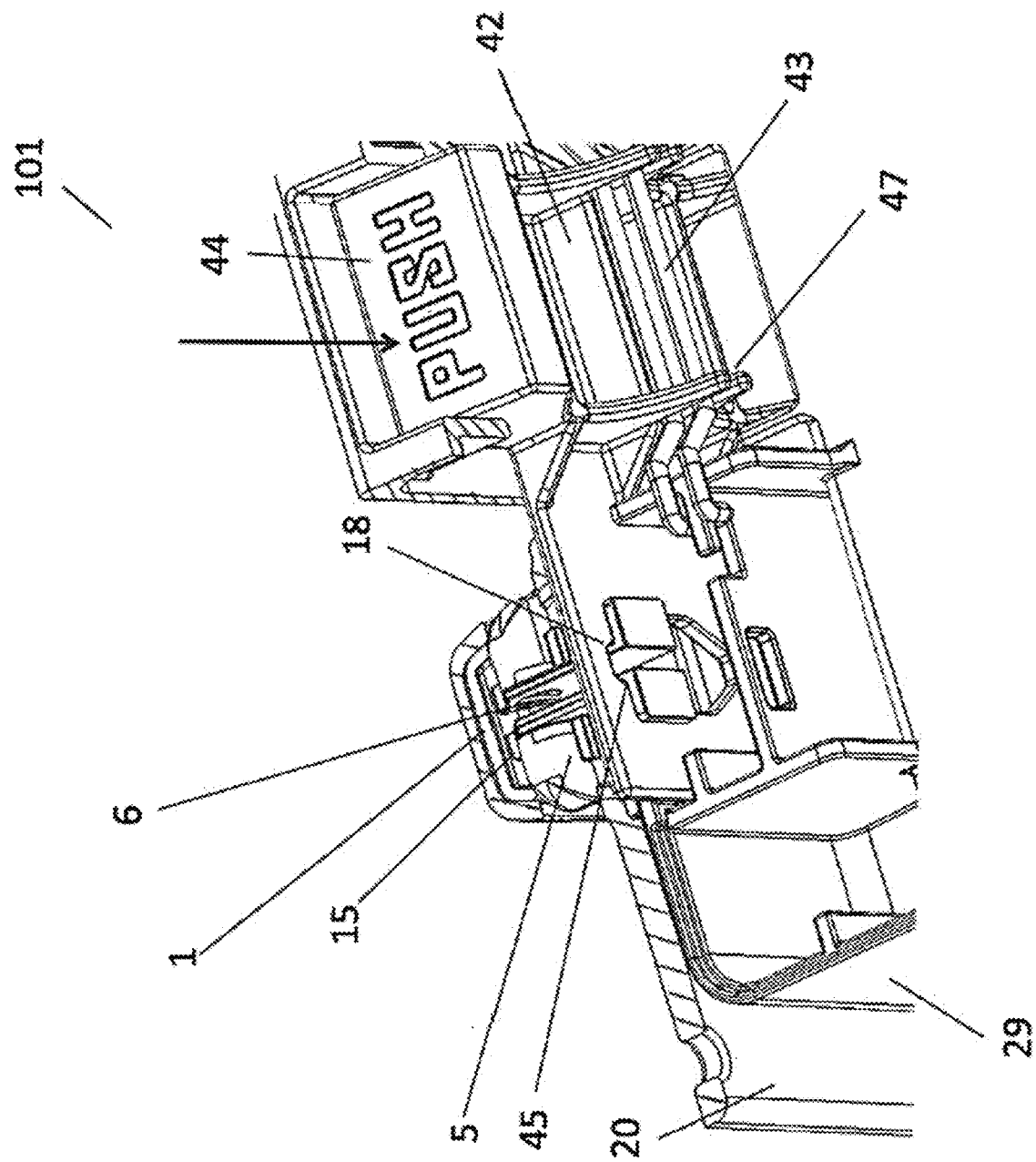
FIG. 18 is an isometric section view showing that the release lever is pushed.

The installation of the component 19 into the interior vehicle panel 20 is shown in FIGS. 7-9. The insert assemblies 1 of the component 19 are installed into the pockets 8 of the interior vehicle panel 20. The tapered surface 10 of the insert housing 3 is guided into position by the taper surface 28 of the interior vehicle panel 20. The ends of the locking tabs 4 of the slide locks 5 come into contact with the tapered surface 28 forcing the slide locks 5 inward along the slide port 26 causing the compression spring 6 to collapse. The insert assembly 1 continues forward until the flange surface 11 of the insert housing 3 comes into contact with the panel recess surface 9 of the interior vehicle panel 20. At this point, the locking tabs 4 of the side lock 5 of the insert assembly 1 align with the locking ports 7 in the interior vehicle panel 20.

The compression spring 6 forces the slide locks 5 along the slide port 26 moving the tab locks 4 of the insert assembly 1 into the locking ports 7 of the interior vehicle panel 20. The insert assemblies 1 will stay locked into this position retaining the component 19 to the interior vehicle panel 20 until an inward force from the release lever 30 is applied to the slide locks 5 collapsing the compression spring 6 pulling the locking tabs 4 out of the locking ports 7 to allow the insert assemblies 1 of the component 19 to be released from the interior vehicle panel 20.

FIG. 10 thru FIG. 13 show the function and operation of a horizontal release lever 30 in conjunction with the insert assemblies 1 within the component 19 allowing it to be removed from the interior vehicle panel 20 after being locked in the modular latching system 100. The release lever 30 includes a push release or lever portion 34, a back stop or back member 35 attached to the push release 34, and a spring guide/retainer 36. The back stop 35 is held horizontally into position by the back stop 35 forced against the internal structure of the upper housings 21 and lower housing 22 by a release spring 31 located in the spring guide/retainer 36 within the release lever 30. The push release 34 of the release lever 30 is accessible from the front side of the component 19 on the opposite side of the insert assemblies 1 allowing the component 19 to be put into the interior vehicle panel 20 upside down or right side up. This gives the component 19 the ability to be a dual purpose accessory.

When an external force is applied to the push release 34 of the release lever 30, the release spring 31 is compressed allowing the release lever to move inward towards the insert assemblies 1. As the release lever 30 moves inward, the tapered angles 33 of the release lever 30 slide over the anti-rotation fins 15 of the slide locks 5. The tapered angles 33 of the release lever 30 apply force to the stop tabs 18 of the slide locks 5 pulling them in away from the slide ports 26 of the insert housing 3 to collapse the compression spring 6. When the release lever 30 is fully engaged in the component 19, the slide locks 5 are fully pulled inside the insert housing 3 allowing the component 19 to be removed from the interior vehicle panel 20.

FIG. 14 to FIG. 18 show another embodiment showing a releasing mechanism of the horizontal release lever 30. A vertical release lever 42 functions in conjunction with the insert assemblies 1 within the component 29 allowing it to be removed from the interior vehicle panel 20 after being locked in to position in the modular latching system 101. The release lever 42 is held vertically into position by elastic bands 43 connected to elastic band retainers 47 on the release lever 42 and the internal structure of the upper housings 21 and lower housing 22. When an external force is applied to the push release 44 of the release lever 42, the elastic band retainers 47 expand allowing the release lever 42 to move downwards towards the insert assemblies 1. The push release 44 of the release lever 42 is accessible from the top and bottom of the component 29 allowing the component 29 to be put into the interior vehicle panel 20 upside down or right side up. This gives the component 29 the ability to be a dual purpose accessory.

When an external force is applied to the push release 44 of the release lever 42, the elastic band retainers 47 expand allowing the release lever 42 to move downward towards the insert assemblies 1. As the release lever 42 moves downward, the tapered angles 45 of the release lever 42 slide over the stop tabs 18 of the slide locks 5. The tapered angles 45 of the release lever 42 apply force to the slide locks 5 to move away from the slide ports 26 of the insert housing 3 collapsing the compression spring 6. When the release lever 42 is fully engaged in the component 29, the slide locks 5 are fully inside the insert housing 3 allowing the component 29 to be removed from the interior vehicle panel 20.

A further embodiment of this invention is a toggle style lock and release lever to allow the component to be installed and removed from the internal vehicle panel without a release lever. The component is only locked to the internal vehicle panel when the component is engaged by and external component.

Figure 19:
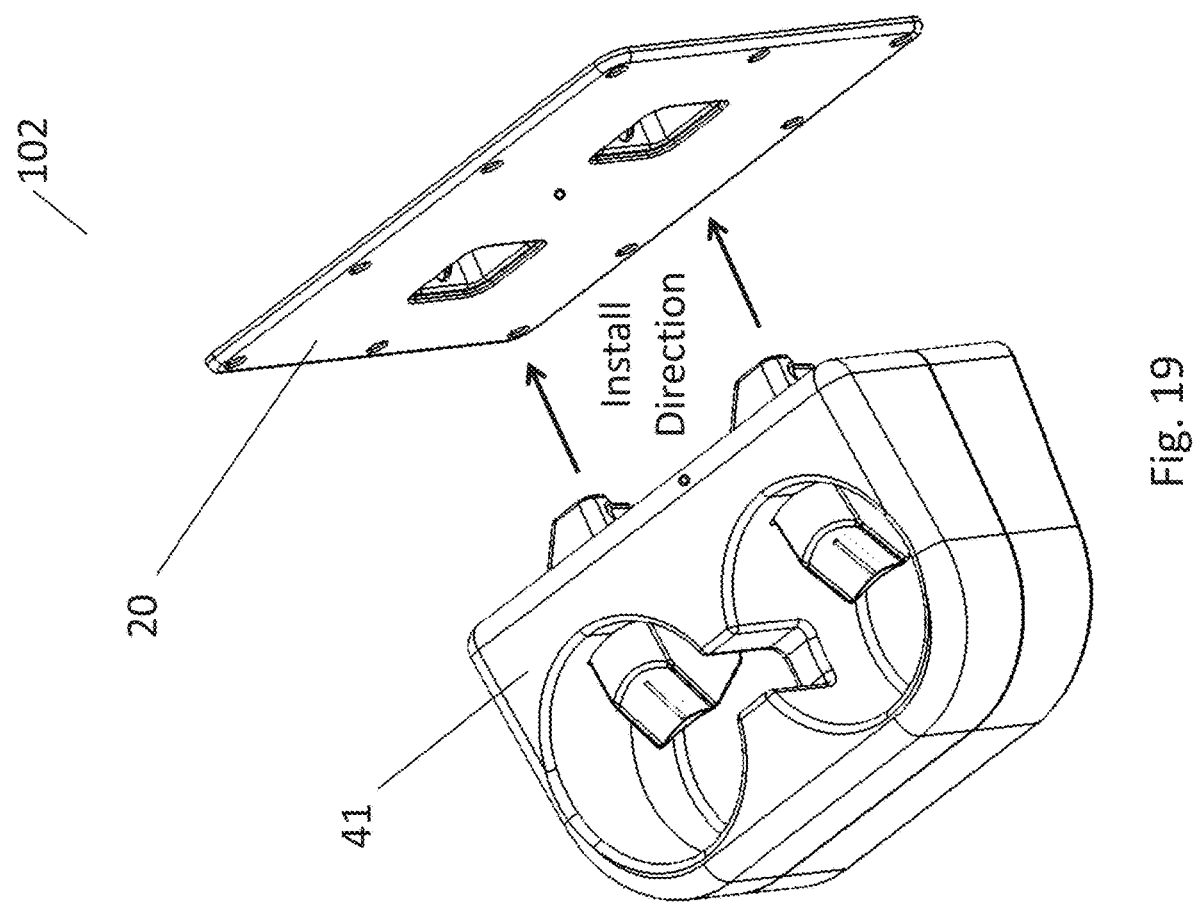
FIG. 19 shows an exploded isometric view of the modular latching system of a further embodiment of the invention.
Figure 20:
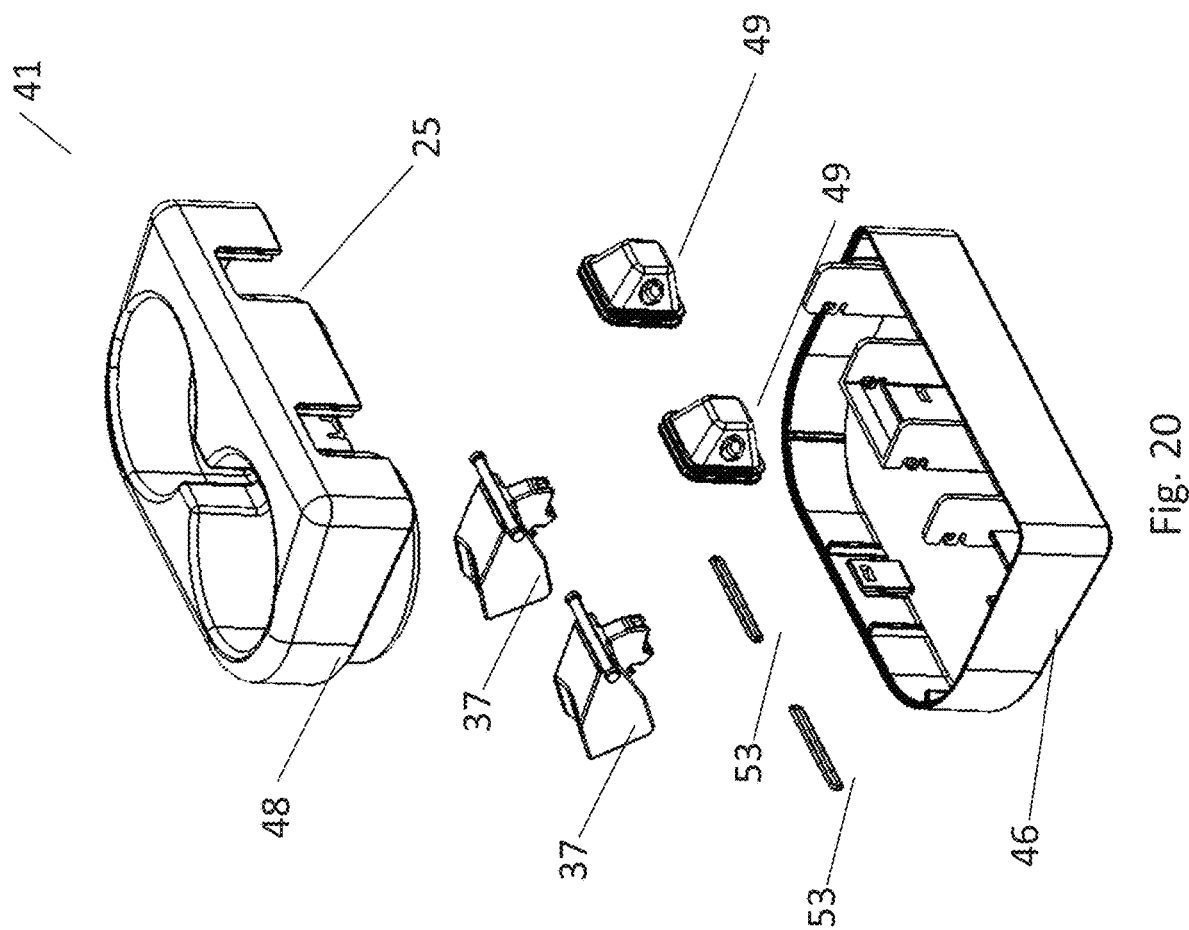
FIG. 20 shows an isometric section view of the modular latching system shown in FIG. 19.
Figure 21:
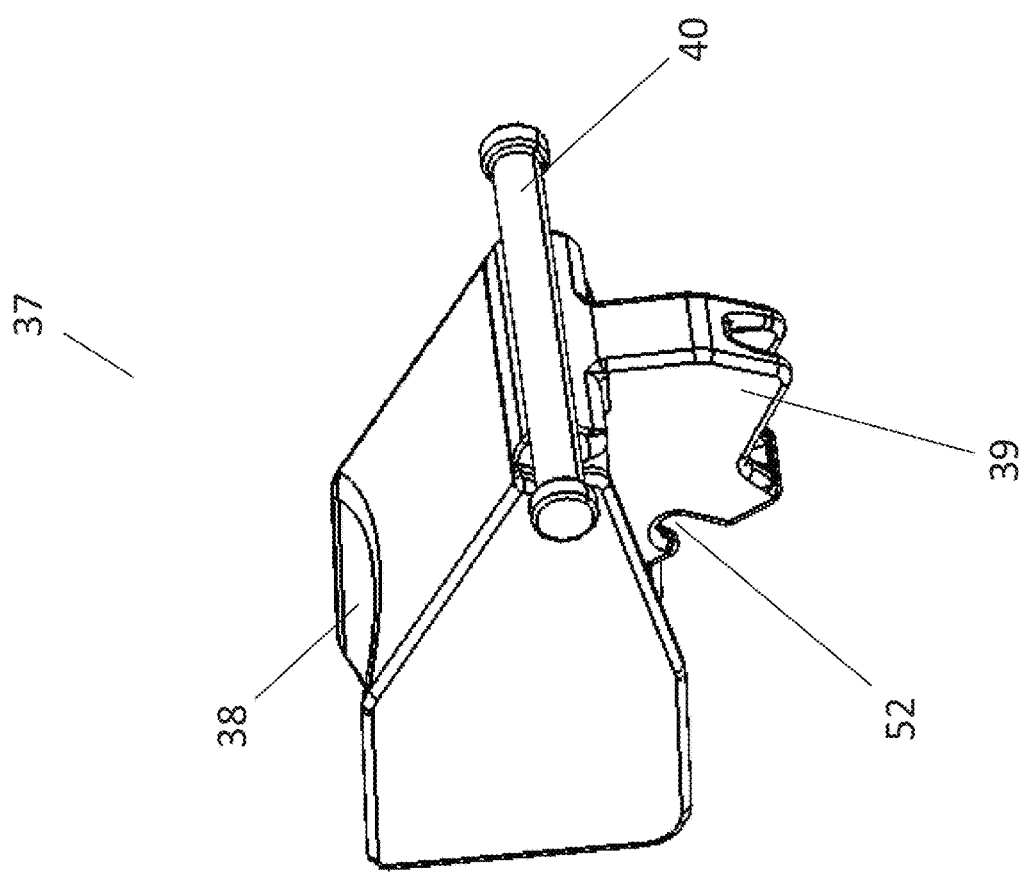
FIG. 21 shows an isometric view of a retaining lever used in the embodiment shown in FIG. 19.
Figure 22:
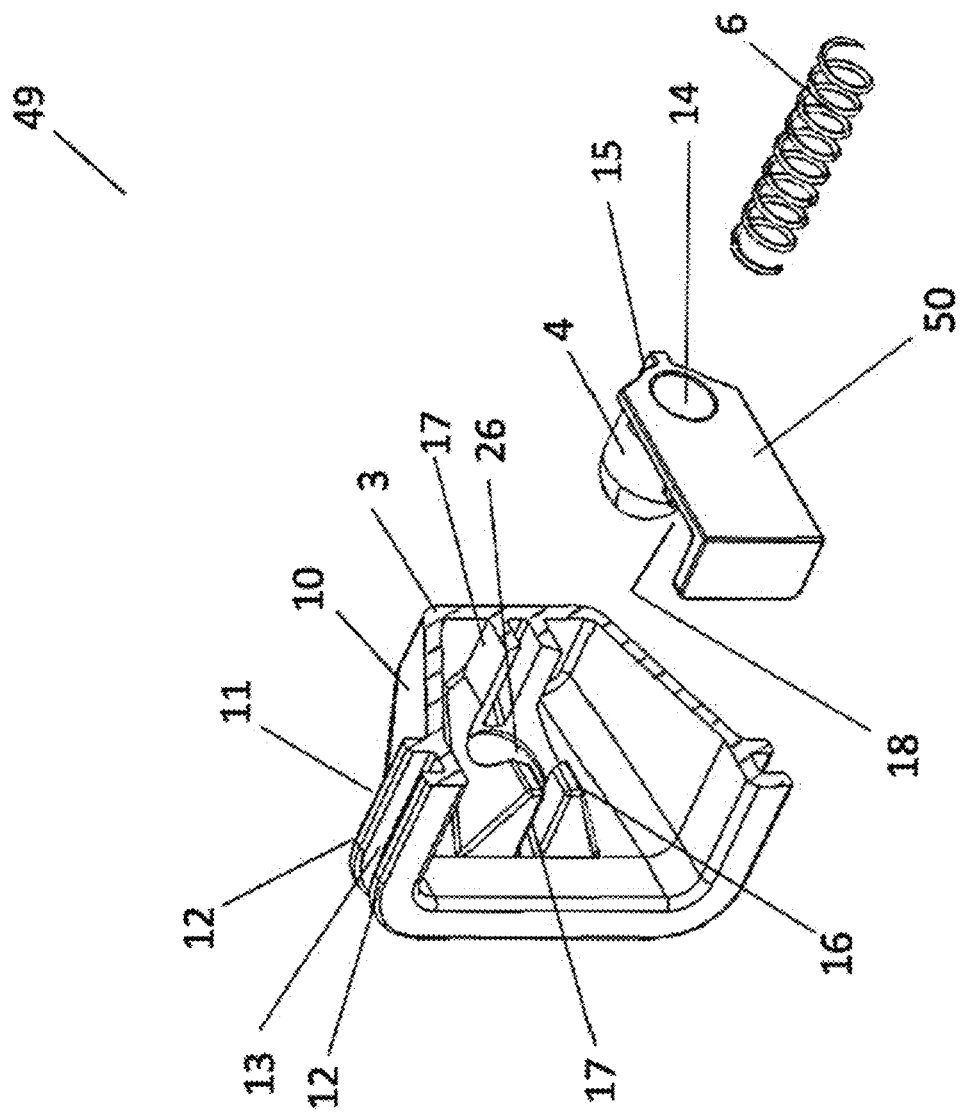
FIG. 22 shows an isometric section view similar to FIG. 5.
Figure 23:
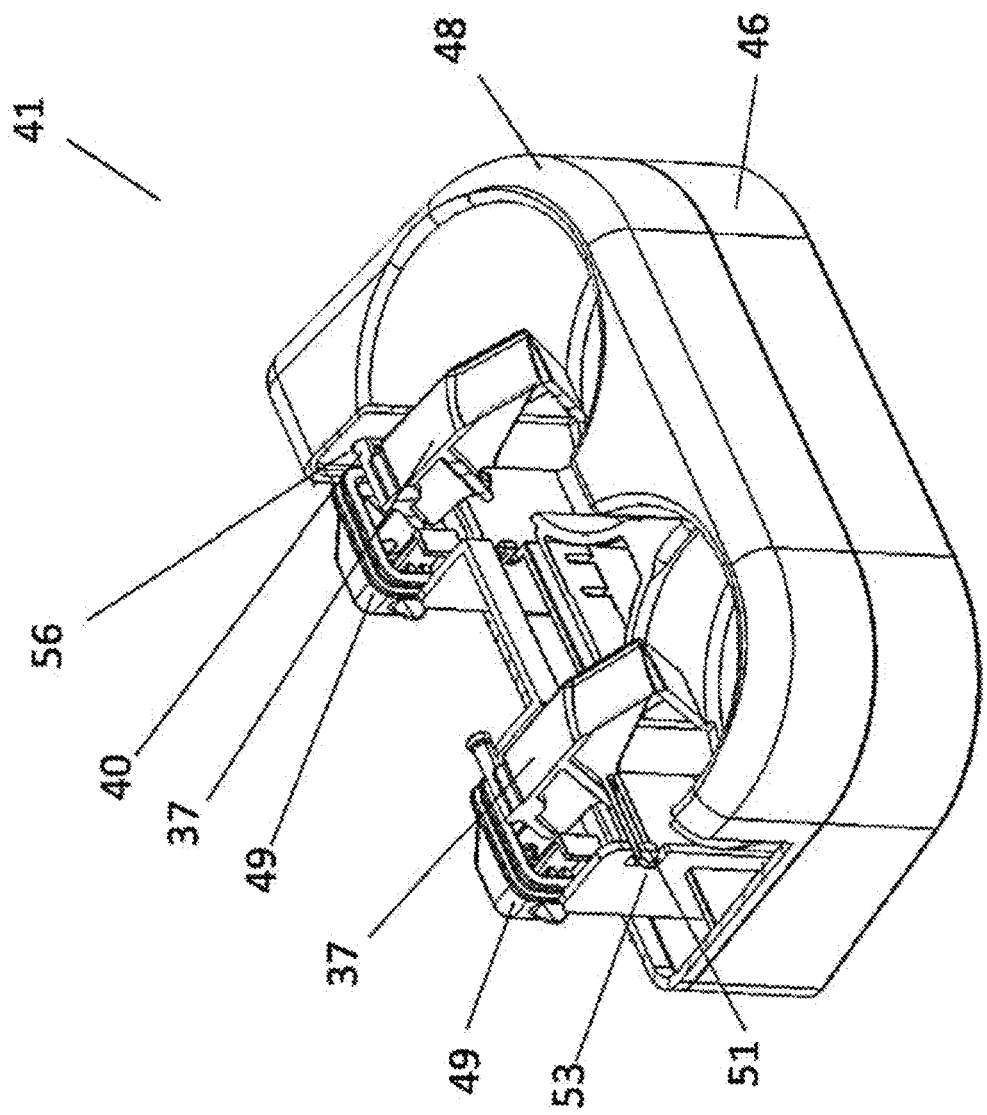
FIG. 23 shows a partially cut section view of the modular latching system.
Figure 24:
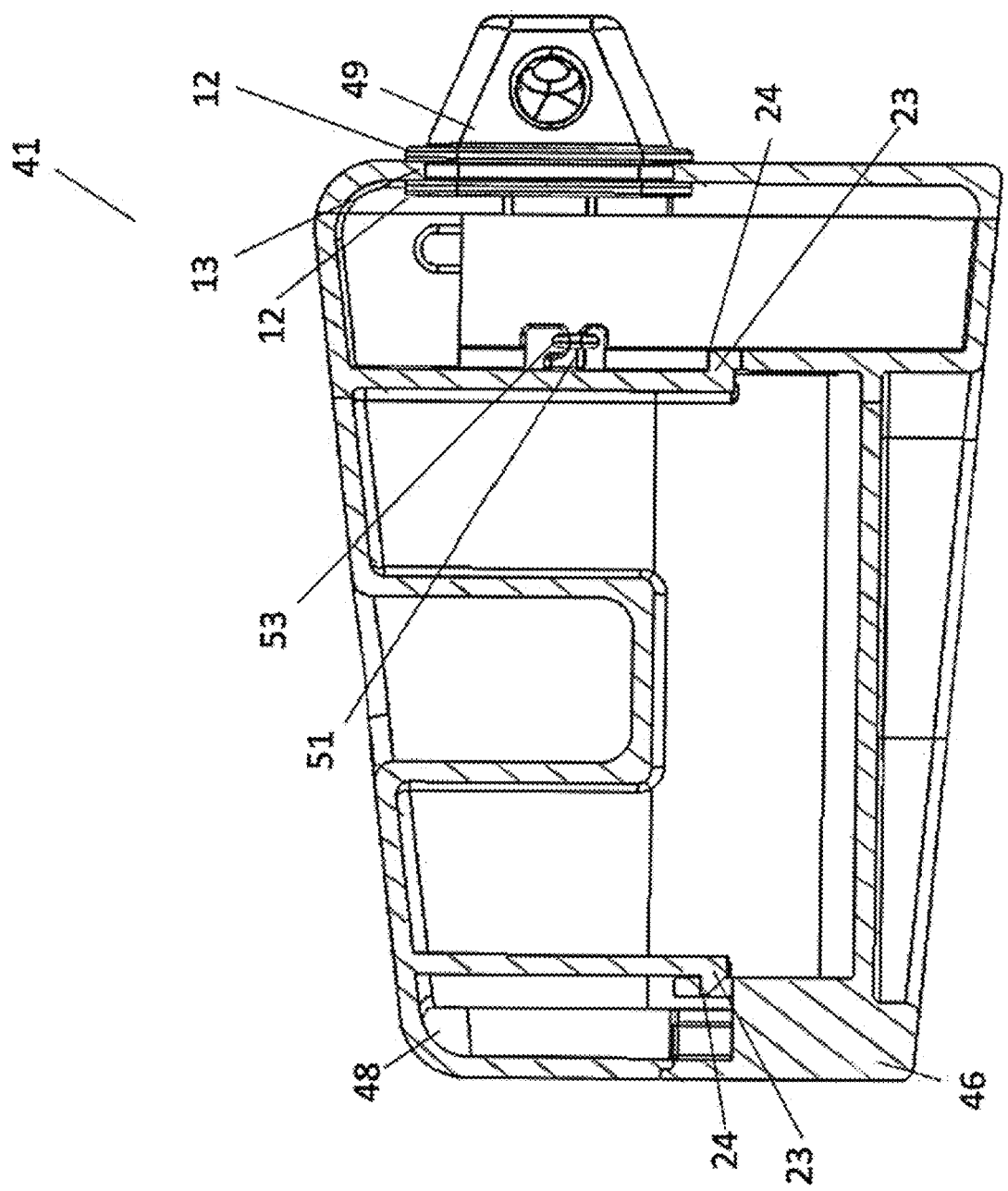
FIG. 24 shows a detailed section view of the modular latching system similar to FIG. 3.

FIG. 19 and FIG. 20 show a modular latch system 102 comprising a component 41 and an interior vehicle panel 20. The component 41 in this example is a cup holder. Within the modular latching system 102, the component 41 can be any form with the same construction to accommodate users' needs, such as a trash bid, storage bin or an accessory holder. The interior vehicle panel 20 containing two recessed pockets 2 molded into its structure.

In FIG. 20 to FIG. 24, the component 41 has a structure comprising an upper housing 48 and a lower housing 46 that sandwich the modular insert assemblies 49 and the retaining lever 37 between them. The upper housing 48 contains locking tabs 23 and the lower housing 46 contains recess tabs 24, as in the first embodiment. When the two housings are assembled, the locking tabs 23 snap into the recess tabs 24 and retain the two housing together.

The upper housing 48 also contains retaining notches 25 that locate and secure the modular insert assemblies 49 within the component 41. The insert assembly 49 has a locating notch 13 with two locating flanges 12 one on either side that surround the full perimeter of the insert housing 3. The locating notches 25 of the upper housing 48 seat between the locating flanges 12 of the insert housing 3 and mate to the locating notch 13 of the insert housing 3 to secure the insert assemblies 49 to the component 41.

A pivot arm 40 on a retaining lever 37 is located and retained within a pivot arm retainer 56 that is built into the internal structure of the upper housing 48. The elastic bands 53 are located and secured on elastic band retainers that are built into the internal structure of the lower housing 46. With the retainer arm 37 located in the housing 48 and elastic bands 53 located in the lower housing 46, the elastic band retainers 52 in the retaining lever 37 located on the elastic bands 53 are assembled together as the housing. When an external force is applied to the guide surface 38, the retainer lever 37 swings down into the upper housing 48 by rotating on the pivot arms 40 as the elastic bands 53 is expanded. The elastic bands 53 provide tension for the retaining arm 37 as pressure is applied and then returns the retaining lever 37 to its resting position when the force is removed.

Figure 25:
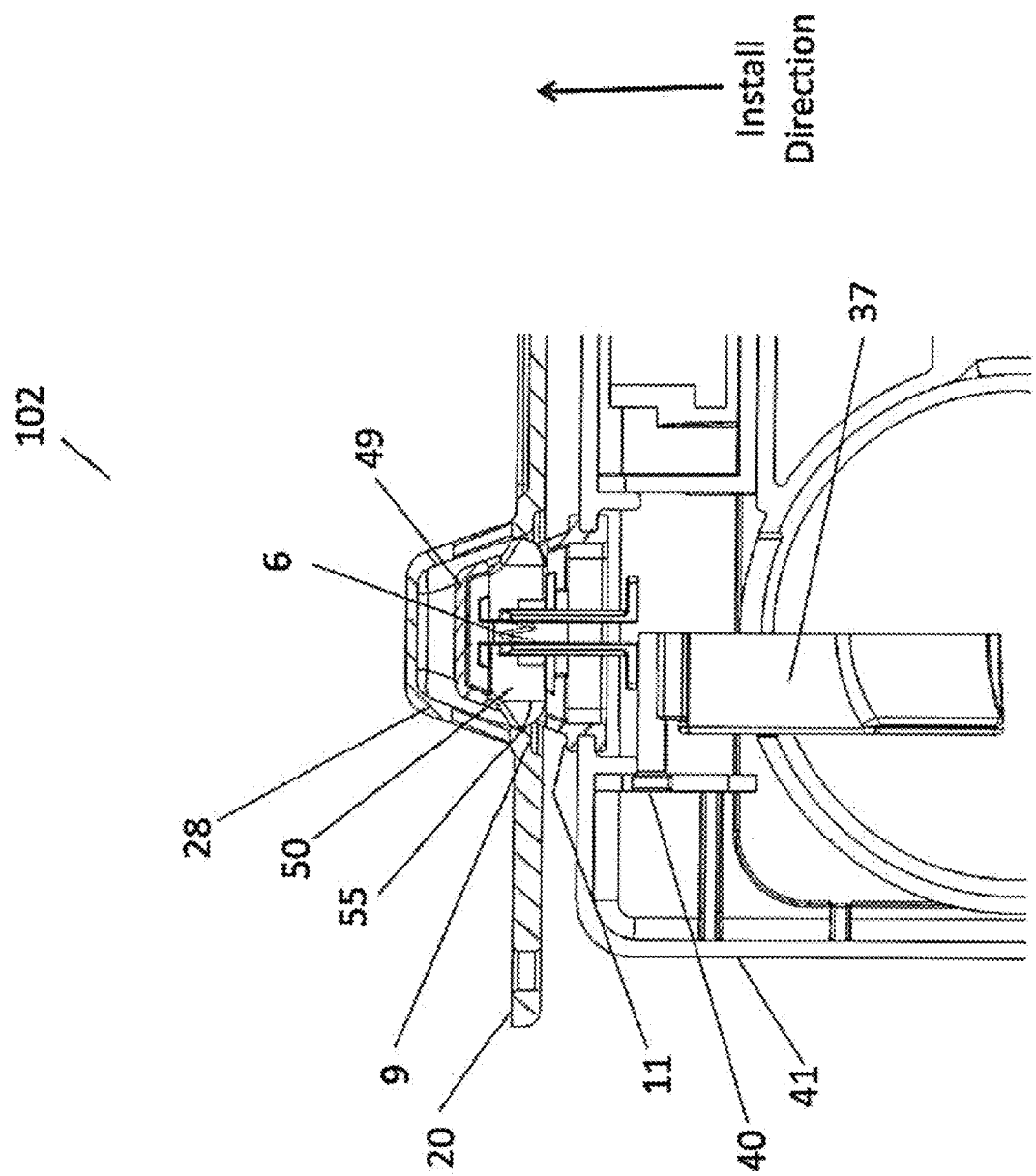
FIG. 25 shows a detailed section view of the modular latching system similar to FIG. 13.
Figure 26:
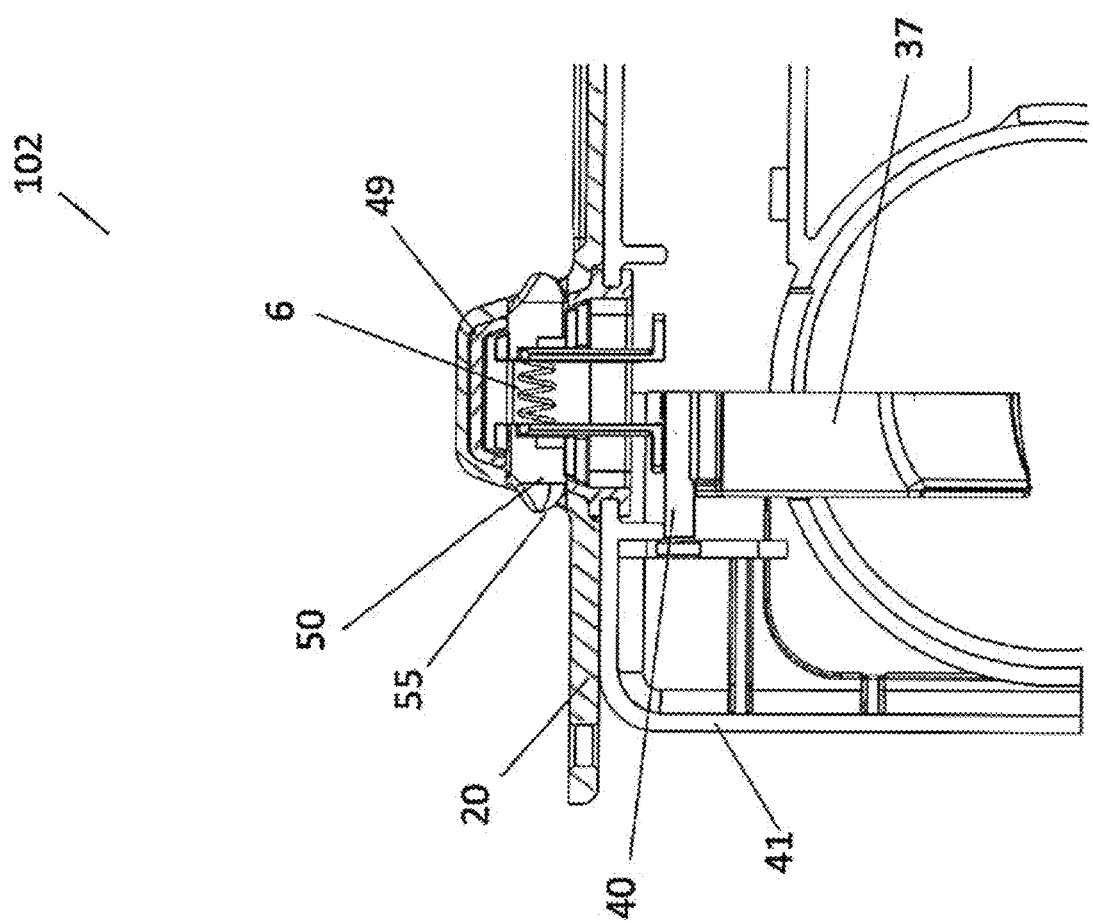
FIG. 26 shows a detailed section view of the modular latching system in a state where a slide locks project.

The locking structure of the component 41 to the interior vehicle panel 20 is the same as shown in FIGS. 15 to 18. Namely, FIG. 25 and FIG. 26 show that the component 41 is installed into the interior vehicle panel 20. The insert assemblies 49 of the component 41 are installed into pockets 8 of the interior vehicle panel 20. The tapered surface 10 of the insert housing 3 is guided into position by the taper surface 28 of the interior vehicle panel 20. The ends of the locking tabs 4 of the slide locks 5 come into contact with the tapered surface 28 forcing the slide locks 50 inward along the slide port 26 causing the compression spring 6 to collapse. The insert assembly 49 continues forward until the flange surface 11 of the insert housing 3 contacts the panel recess surface 9 of the interior vehicle panel 20.

At this point, the locking tabs 4 of the side lock 50 of the insert assembly 49 align with the locking ports 7 in the interior vehicle panel 20. The compression spring 6 forces the slide locks 50 along the slide port 26 moving the tab locks 4 into the insert assembly 49 into the locking ports 7 in the interior vehicle panel 20.

Figure 27:
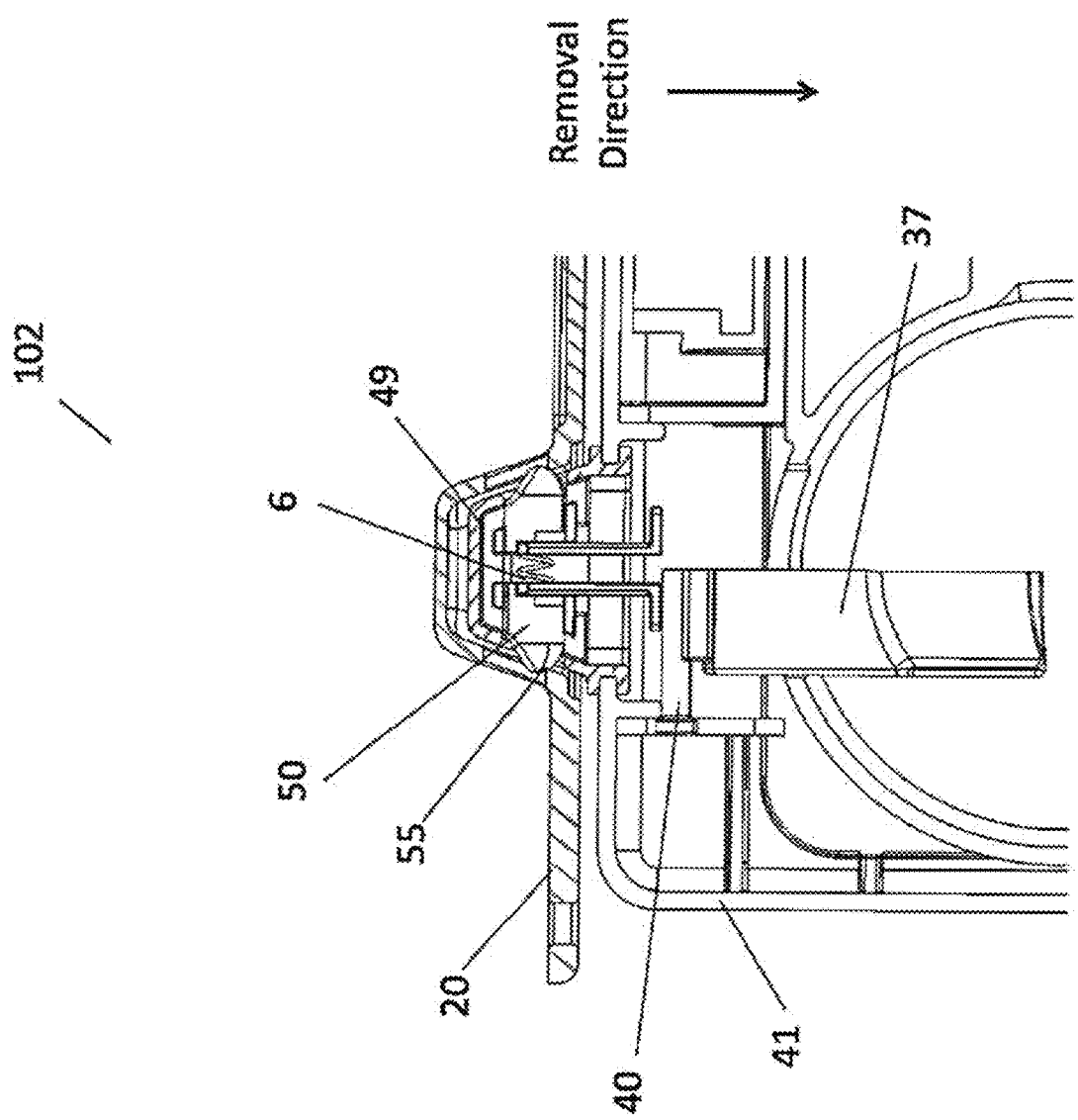
FIG. 27 shows a detailed section view of the modular latching system in a state where the slide locks are retracted.

The component 41 is removed from the interior vehicle panel 20 is shown in FIG. 27, wherein the modular insert assemblies 49 of the component 41 are removed from the pockets 8 of the interior vehicle panel 20. The rounded surfaces 55 on the ends of the slide lock 50 are forced to contact the edges of the locking ports 7 in the pockets 8 as a rearward force is applied to the component 41, as in the embodiment shown in FIGS. 15 to 18. This contact forces the slide locks 50 inward along the slide port 26 to cause the compression spring 6 to collapse. When the slide locks 50 are fully moved inside the insert housing 3, the component 41 can be removed from the interior vehicle panel 20.

Figure 28:
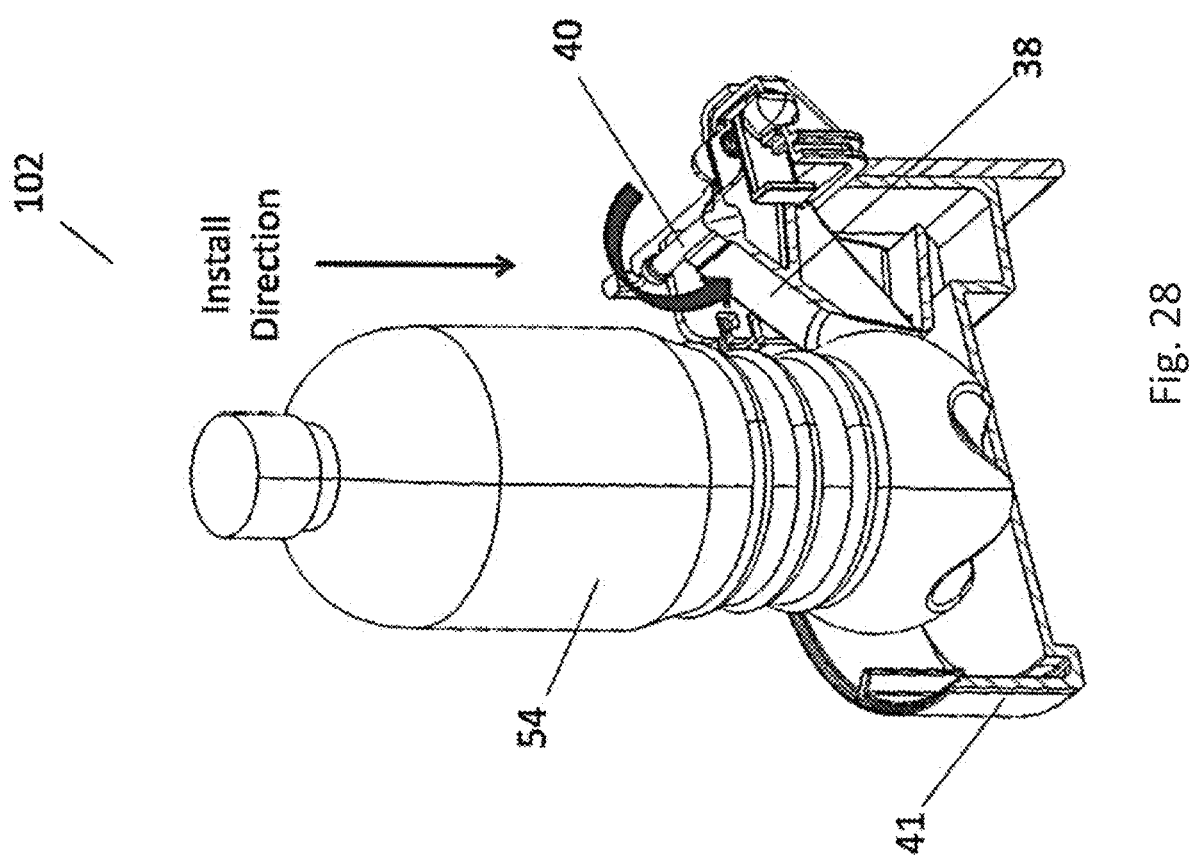
FIG. 28 shows an isometric view of the modular latching system in use.
Figure 29:
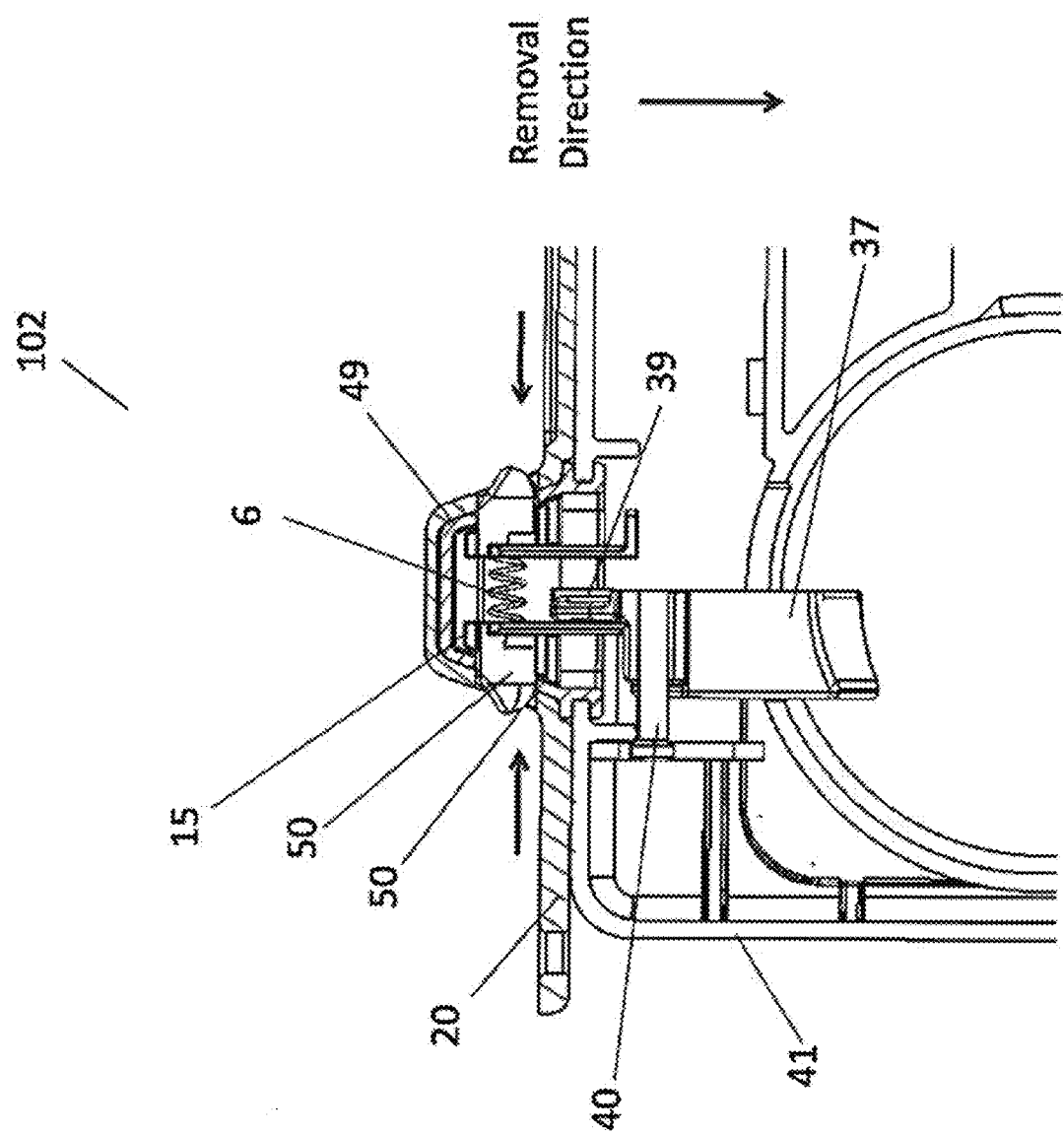
FIG. 29 shows a section view similar to FIG. 25.

FIG. 28 and FIG. 29 show a container 54 being installed into the component 41. The container 54 pushes down on the end of the retaining lever 37 as it goes into the component 41. The guide surface 38 of the retaining lever 37 supports the container 54 as the retaining lever 37 rotates on its pivot arms 40 within the upper housing 48. The elastic band 53 expands as the retaining lever 37 is rotated creating tension between the guide surface 38 and the container 54. The tension allows the guide surface 38 to locate and secure the container 54 within the component 41.

When the retaining lever 37 is rotated to retain the container 54, the retaining tab 39 is positioned inside the insert housing 3 in between the slide locks 50. With the retaining tab 39 in this positon, the slide locks 50 cannot be compressed into the insert housing 3, thus locking the component 41 to the internal vehicle panel 20. The component 41 will remain locked to the internal vehicle panel 20 until the container 54 is removed and the retaining lever 37 is allowed to rotate to its resting position.

The features of the invention are explained with reference to the drawings, but the invention is not limited to the embodiments of shown in the drawings. The invention is limited only by the appended claims.

What is claimed is:
1. A modular latching system, comprising:
a panel having recessed pockets spaced apart from each other and having lock holes therein, and a component having insert assemblies on one side of the component, the insert assemblies projecting from the component and being spaced apart from each other to be inserted into the recessed pockets,
wherein each of the insert assemblies includes an insert housing,
two lock tabs projecting away from each other to pass through the insert housing to engage the lock holes of one pocket,
two slide locks, each being arranged to extend from each of the lock tabs, and
one spring arranged between the two slide locks to push the lock tabs away from each other so that when the insert housing is inserted into the recessed pocket, the lock tabs enter the lock holes to lock the insert housing to the panel, and
wherein the insert assemblies include a release lever engaging the respective slide locks, said release lever having tapered portions engaging the slide locks of the respective insert assemblies so that when the release lever is pushed, the respective slide locks move to disengage the lock tabs from the lock holes to release the component from the panel.

2. A module latching system according to claim 1, wherein each of the recessed pockets includes a tapered part, and
the insert housing includes a tapered portion entering into the tapered part and having an open back.

3. A module latching system according to claim 1, wherein the release lever includes a lever portion, and a back member attached to the lever portion and having the respective tapered portions engaging the slide locks so that when the lever portion is pushed, the back member pushes the respective slide locks to move close to each other to thereby disengage the lock tabs from the lock holes.

4. A modular latching system according to claim 3, wherein the release lever further includes a spring arranged between the lever portion and the panel to push the lever portion in a direction away from the panel.

5. A modular latching system according to claim 3, wherein the back member includes the tapered portions engaging the slide locks so that when the lever portion is pushed, the back member with the tapered portions moves downwardly to slide the slide locks to move close to each other.

6. A combination of a vehicle interior panel, and the modular latching system according to claim 1, wherein the panel with the recessed pockets is the vehicle interior panel.

7. A modular locking system according to claim 1, wherein the two lock tabs in one insert assembly align side by side in one direction with the two lock tabs in another insert assembly so that the locking taps in the one and another insert assemblies are released simultaneously by the release lever.

8. A modular latching system according to claim 7, wherein the component comprises an upper housing and a lower housing, each having two retaining notches facing each other and receiving the insert assemblies therein so that the insert assemblies are held between the upper housing and the lower housing and project outwardly from a surface of the component.

9. A modular latching system, comprising:
a panel having recessed pockets spaced apart from each other and having lock holes therein,
a housing having insert assemblies on one side of the housing, the insert assemblies being spaced apart from each other to be inserted into the recessed pockets,
locking members located in each of the insert assemblies and including lock tabs engaging the lock holes, and slide locks arranged to extend from the lock tabs so that when the insertion assemblies are inserted into the recessed pockets, the lock tabs enter the lock holes to lock the housing to the panel,
a release lever disposed in the housing and engaging the slide locks so that when the release lever is pushed, the slide locks move to disengage the lock tabs from the lock holes to release the housing from the panel,
a retaining member disposed in the housing,
a pivot portion attached to the retaining member for pivotally retaining the retaining member in the housing, and
a retaining tab integrally formed with the retaining member so that when the retaining member is pushed in one direction, the retaining tab moves to block sliding of the slide locks to prevent the housing from being removed from the panel.

10. A combination of a cup holder, and the modular latching system according to claim 9, wherein the housing is the cup holder, and the retaining member projects inwardly into a holding portion of the cup holder so that when a cup is inserted into the holding portion, the retaining member is pushed outwardly to thereby move the retaining tab to block sliding of the slide locks.

* * * * *